US012636715B2

(12) United States Patent
Lang et al.

(10) Patent No.: US 12,636,715 B2
(45) Date of Patent: May 26, 2026

(54) SYSTEMS WITH ROBOTIC ARMS FOR HANDLING AND MILLING A WORKPIECE, AND FOR POSITIONING A VACUUM POD ON A MILLING PLATFORM

(71) Applicant: INTELLIGENT CITY INC., Vancouver (CA)

(72) Inventors: Oliver Lang, Vancouver (CA); Oliver David Krieg, Vancouver (CA); Aaron Willette, Vancouver (CA); Stuart Lodge, North Vancouver (CA); Nicholas Hamel, Vancouver (CA)

(73) Assignee: INTELLIGENT CITY INC., Vancouver (CA)

( * ) Notice: Subject to any disclaimer, the term of this patent is extended or adjusted under 35 U.S.C. 154(b) by 609 days.

(21) Appl. No.: 18/153,982

(22) Filed: Jan. 12, 2023

(65) Prior Publication Data

US 2024/0238881 A1 Jul. 18, 2024

(51) Int. Cl.
B23Q 7/04 (2006.01)
B23C 1/12 (2006.01)
(Continued)

(52) U.S. Cl.
CPC ................. B23C 1/12 (2013.01); B23Q 7/04 (2013.01); B23Q 7/1442 (2013.01); (Continued)

(58) Field of Classification Search
CPC .............................. B25J 11/005–11/007; B25J 15/06–15/0691; B25J 5/02; B23C 1/12; (Continued)

(56) References Cited

U.S. PATENT DOCUMENTS 5,897,275 A * 4/1999 Sella ...................... B23Q 1/037
409/225
6,488,060 B1 * 12/2002 Giovanni ............... B23Q 1/037
269/21
(Continued)

FOREIGN PATENT DOCUMENTS

CN 207087164 U 3/2018
CN 210524437 U 5/2020
(Continued)

OTHER PUBLICATIONS

Machine Translation CN 112388474 A from the European Patent Office, which CN '474 was published Feb. 23, 2021.*

(Continued)

*Primary Examiner* — Erica E Cadugan
(74) *Attorney, Agent, or Firm* — Aird & McBurney LP

(57) ABSTRACT

A system for processing a workpiece includes a milling platform, a workpiece handling robotic arm (WHRA), and a spindle robot arm (SRA). The WHRA has a holding tool adapted to move the workpiece from an input staging area to the milling platform, and from the milling platform to an output staging area. A base of the WHRA, the input staging area, the output staging area are all positioned on a same side of the milling platform. The SRA has a milling tool and is adapted to mill the workpiece when supported on the milling platform. The system may include a processor configured to control the WHRA to move the holding tool to a release position or orientation based on positional data of the workpiece generated by contact position sensors, and to move a robotic arm to position vacuum pods on the milling platform, based on the geometry of the workpiece.

17 Claims, 30 Drawing Sheets

(51) Int. Cl.

| | |
|---|---|
| *B23Q 7/14* | (2006.01) |
| *B23Q 11/08* | (2006.01) |
| *B25J 9/00* | (2006.01) |
| *B25J 11/00* | (2006.01) |
| *B25J 15/06* | (2006.01) |
| *B23Q 1/03* | (2006.01) |
| *B23Q 3/08* | (2006.01) |
| *B23Q 7/16* | (2006.01) |

(52) U.S. Cl.

CPC ........ *B23Q 7/1494* (2013.01); *B23Q 11/0891* (2013.01); *B25J 9/0093* (2013.01); *B25J 9/0096* (2013.01); *B25J 11/0055* (2013.01); *B23C 2270/08* (2013.01); *B23Q 1/037* (2013.01); *B23Q 3/088* (2013.01); *B23Q 7/1436* (2013.01); *B23Q 7/165* (2013.01); *B23Q 2703/04* (2013.01); *B23Q 2707/04* (2013.01); *B25J 15/0616* (2013.01); *Y10T 29/5107* (2015.01); *Y10T 409/30392* (2015.01); *Y10T 409/307672* (2015.01); *Y10T 409/309016* (2015.01)

(58) Field of Classification Search

CPC .......... Y10T 409/307672; Y10T 409/308232; Y10T 409/308512; B24B 27/0084; B23Q 7/04; B23Q 7/041–7/048; B23Q 7/1494; B23Q 2707/04; B23Q 3/088; B23Q 1/037; B23Q 2230/002; B23Q 7/165; B25B 11/005

USPC ................ 409/201, 211, 216; 269/55–85, 21

See application file for complete search history.

(56) References Cited

U.S. PATENT DOCUMENTS

| | | | |
|---|---|---|---|
| 2014/0286734 A1 | | 9/2014 | Oda |
| 2018/0065192 A1 | * | 3/2018 | Kschier ................ B23Q 1/5475 |
| 2022/0001551 A1 | | 1/2022 | Reilly et al. |
| 2022/0032476 A1 | | 2/2022 | Robertson |
| 2022/0055208 A1 | | 2/2022 | Li et al. |

FOREIGN PATENT DOCUMENTS

| | | | | |
|---|---|---|---|---|
| CN | 112388474 A | | 2/2021 | |
| DE | 4444339 C1 | * | 10/1995 | |
| DE | 102021005730 A1 | * | 1/2022 | |
| EP | 3140076 A2 | * | 3/2017 | |
| JP | 58-040201 A | * | 3/1983 | |
| WO | WO-2015/169918 A2 | * | 11/2015 | |

OTHER PUBLICATIONS

Machine Translation of DE 102021005730 A1, which DE '730 was published Jan. 5, 2022.*

Machine Translation of JP 58-040201 A, which JP '201 was published Mar. 9, 1983.*

Machine Translation of CN 210524437 U from the European Patent Office, which CN '437 was published May 15, 2020.*

International Search Report and Written Opinion from corresponding PCT Application No. PCT/CA2024/050012 dated Apr. 5, 2024.

* cited by examiner

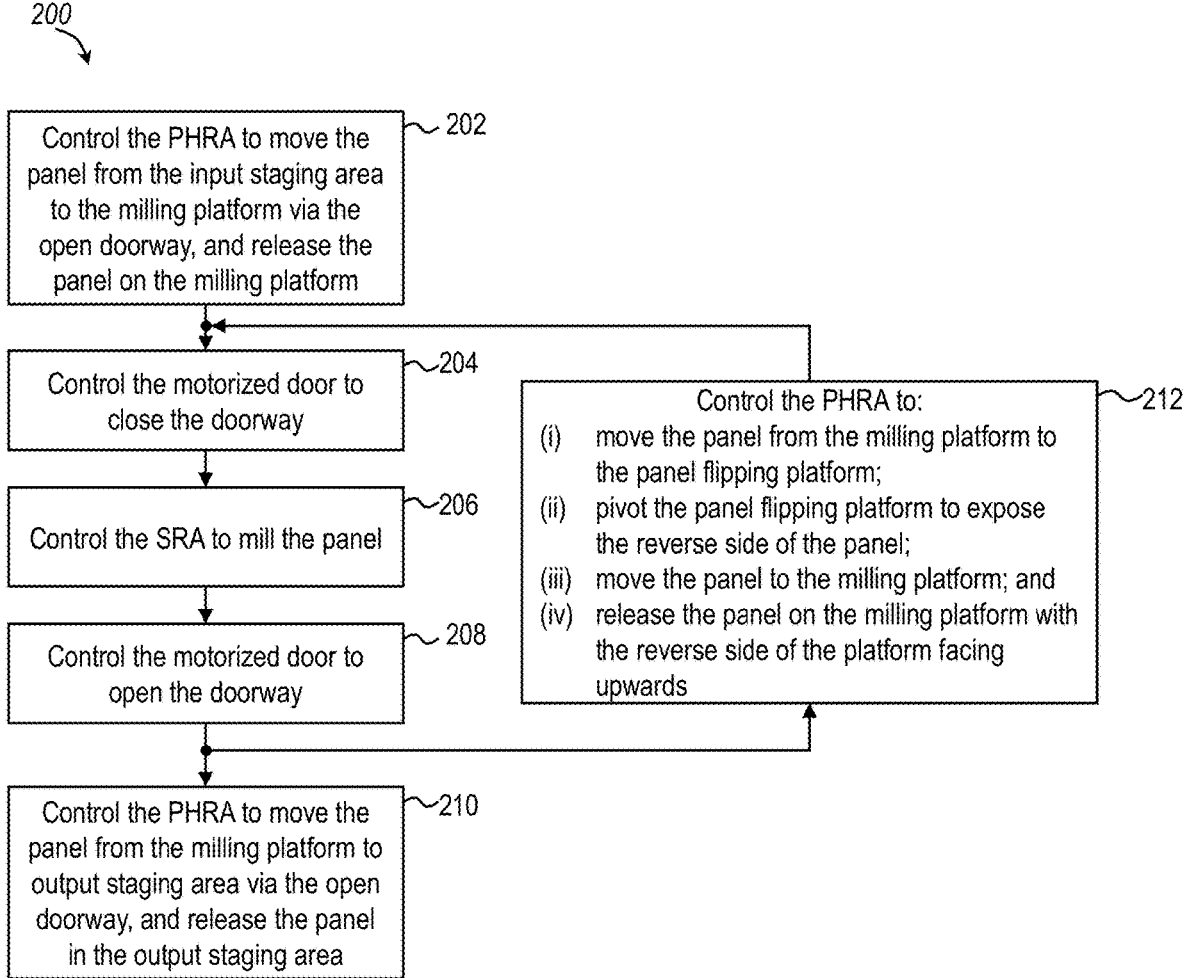

*200*

Control the PHRA to move the panel from the input staging area to the milling platform via the open doorway, and release the panel on the milling platform ⌐~ 202

Control the motorized door to close the doorway ⌐~204

Control the SRA to mill the panel ⌐~206

Control the motorized door to open the doorway ⌐~ 208

Control the PHRA to:
(i)    move the panel from the milling platform to the panel flipping platform;
(ii)   pivot the panel flipping platform to expose the reverse side of the panel;
(iii)  move the panel to the milling platform; and
(iv)   release the panel on the milling platform with the reverse side of the platform facing upwards ⌐~212

Control the PHRA to move the panel from the milling platform to output staging area via the open doorway, and release the panel in the output staging area ⌐~210

*FIG. 28*

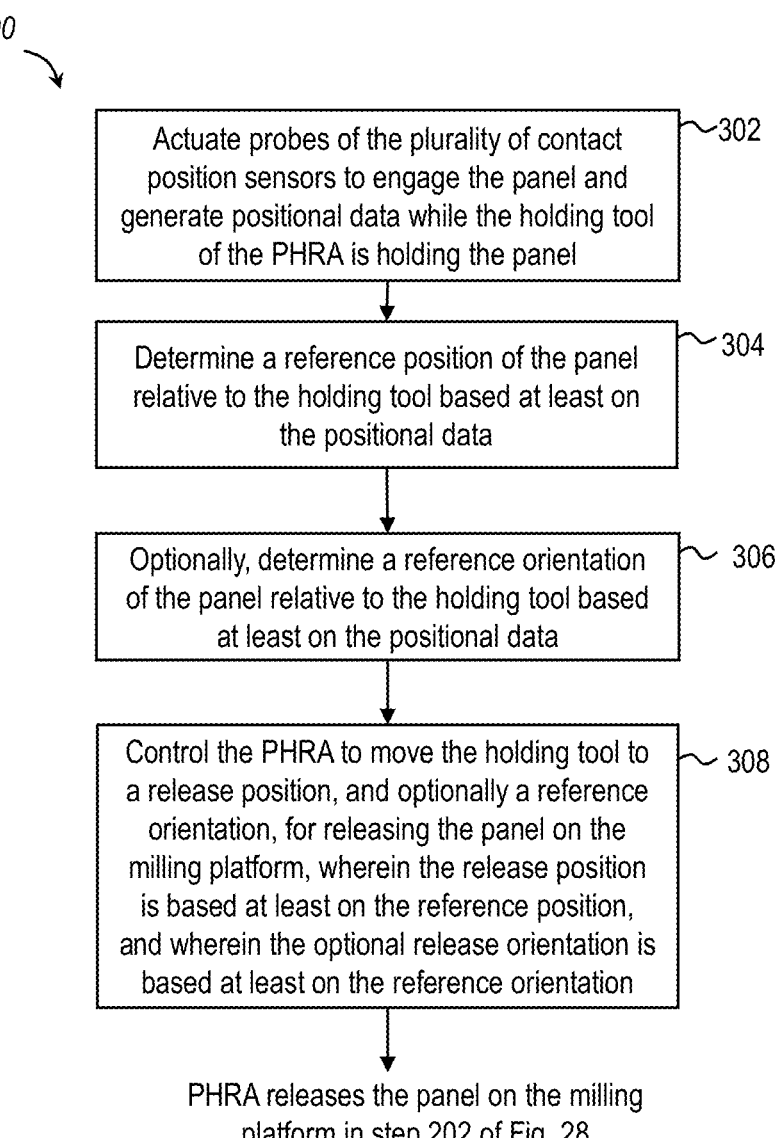

*300*

Actuate probes of the plurality of contact position sensors to engage the panel and generate positional data while the holding tool of the PHRA is holding the panel — 302

Determine a reference position of the panel relative to the holding tool based at least on the positional data — 304

Optionally, determine a reference orientation of the panel relative to the holding tool based at least on the positional data — 306

Control the PHRA to move the holding tool to a release position, and optionally a reference orientation, for releasing the panel on the milling platform, wherein the release position is based at least on the reference position, and wherein the optional release orientation is based at least on the reference orientation — 308

PHRA releases the panel on the milling platform in step 202 of Fig. 28

*FIG. 29*

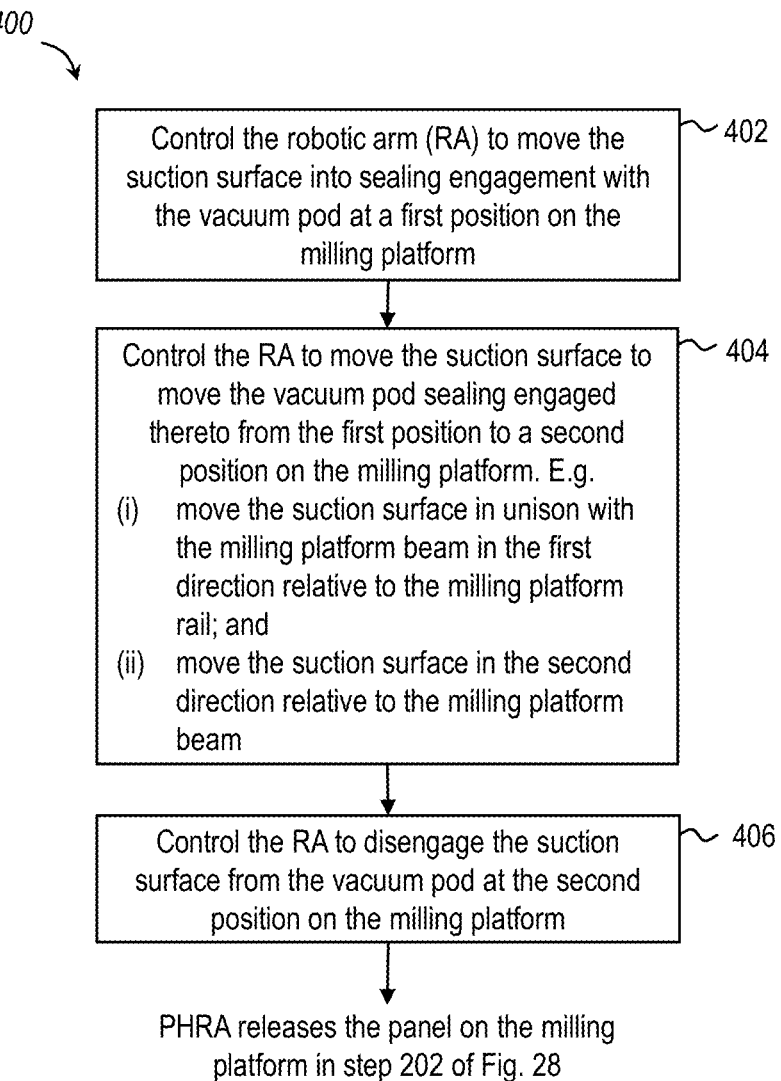

*400*

Control the robotic arm (RA) to move the suction surface into sealing engagement with the vacuum pod at a first position on the milling platform — 402

Control the RA to move the suction surface to move the vacuum pod sealing engaged thereto from the first position to a second position on the milling platform. E.g. — 404
(i)   move the suction surface in unison with the milling platform beam in the first direction relative to the milling platform rail; and
(ii)  move the suction surface in the second direction relative to the milling platform beam Control the RA to disengage the suction surface from the vacuum pod at the second position on the milling platform — 406

PHRA releases the panel on the milling platform in step 202 of Fig. 28

*FIG. 30*

SYSTEMS WITH ROBOTIC ARMS FOR HANDLING AND MILLING A WORKPIECE, AND FOR POSITIONING A VACUUM POD ON A MILLING PLATFORM

FIELD OF THE DISCLOSURE

This disclosure relates to systems that utilize robotic arms with computerized numerical control (CNC) for handling and milling of workpieces, including panels (e.g. wood panels used in building construction), and to position a vacuum pod on a milling platform.

BACKGROUND OF THE DISCLOSURE

Construction of buildings using pre-fabricated wood panels can provide significant efficiencies. A large building may require thousands of such wood panels of different geometries. Rapid and automated manufacturing of such wood panels is imperative to realizing the aforementioned efficiencies. However, pre-fabrication in construction usually does not allow for automated and adaptable manufacturing workflows.

One conventional approach to milling wood panels in timber construction involves moving panels from an input staging area through a milling machine to an output staging area, in an inline arrangement. This set-up, however, requires an elongated footprint. Further, the milling machine is configured to receive and produce panels having a certain geometry. Further still, the handling and post-processing processes may require significant human labor, which adds to production time and cost. This is because such machines are usually designed to sit independently in otherwise manually operated factories.

There remains a need in the art for technologies that enable handling and milling of wood panels in a precise, rapid and space-efficient manner, and that can conveniently accommodate panels of different geometries. There also remains a need to integrate large-scale milling workflows in assembly lines for timber construction or building pre-fabrication with higher automation.

SUMMARY OF THE INVENTION

The present disclosure relates generally to handling and milling of a workpiece using one or more robotic arms. In embodiments, the workpiece may be a panel, and more particularly a wood panel, which is used for pre-fabricated construction of a building.

In one aspect, the present disclosure includes a system (referred to herein as a "processing system") for processing a workpiece from an input staging area to an output staging area. The processing system comprises: a milling platform; a workpiece handling robotic arm (WHRA); and at least one spindle robotic arm (SRA), which may comprise a plurality of SRAs. The WHRA comprises a holding tool adapted to releasably hold the workpiece. The WHRA is adapted to move the workpiece from the input staging area to the milling platform, and from the milling platform to the output staging area. A base of the WHRA, the input staging area, the output staging area are all positioned on a same side of the milling platform. Each of the at least one SRA comprises a milling tool. Each of the at least one SRA is adapted to mill the workpiece when supported on the milling platform.

In embodiments of the processing system, the input staging area and the output staging area are spaced apart from each other, and the WHRA base is disposed between the input staging area and the output staging area.

In embodiments of the processing system, the at least one SRA comprises a SRA base, and the milling platform is disposed between the WHRA base and the SRA base.

In embodiments of the processing system, the processing system further comprises either one or both of: an input platform to support the workpiece at the input staging area, wherein the input platform is movable toward and away from the WHRA; or an output platform to support the workpiece at the output staging area, wherein the output platform is movable toward and away from the WHRA. The processing system may comprise one or both of: an input wheeled cart comprising the input platform; or an output wheeled cart comprising the output platform. The processing system may comprise either one or both of: an input track engaged by the input platform to guide movement of the input platform toward and away from the WHRA; or an output track engaged by the output platform to guide movement of the output platform toward and away from the WHRA.

In embodiments of the processing system, the holding tool comprises a vacuum lifter.

In embodiments of the processing system, the milling tool comprises either a bit, blade, disc, or drum for cutting, drilling, engraving, grinding, routing or sanding the workpiece.

In embodiments of the processing system, the processing system further comprises a workpiece flipping platform pivotable to expose a reverse side of the workpiece to the holding tool of the WHRA, when the workpiece is supported on the workpiece flipping platform. The workpiece flipping platform may be disposed on the same side of the milling platform as the input staging area and the output staging area.

In embodiments of the processing system, the processing system further comprises a processor operatively connected to the WHRA, and the at least one SRA. The processor is configured by a non-transitory computer readable medium storing instructions executable by the processor to implement a method comprising: controlling the WHRA to move the workpiece from the input staging area to the milling platform, and release the workpiece on the milling platform; controlling the at least one SRA to mill the workpiece; and controlling the WHRA to move the workpiece from the milling platform to the output staging area, and release the workpiece at the output staging area.

In embodiments of the processing system, the processing system further comprises a doorway and a motorized door. The doorway allows the WHRA to move the workpiece between the milling platform, and the input staging area and the output staging area. The motorized door is actuable between an open position to open the doorway and a closed position to close the doorway and separate the WHRA from the milling platform and the at least one SRA. The processing system may further comprise a processor operatively connected to the WHRA, the at least one SRA, and the motorized door. The processor is configured by a non-transitory computer readable medium storing instructions executable by the processor to implement a method comprising: controlling the WHRA to move the workpiece from the input staging area via the open doorway to the milling platform, and release the workpiece on the milling platform; controlling the motorized door to close the doorway; controlling the at least one SRA to mill the workpiece while the doorway is closed; controlling the motorized door to open the doorway; and controlling the WHRA to move the workpiece from the milling platform via the open doorway to the output staging area, and release the workpiece at the output staging area.

In embodiments of the processing system, the WHRA comprises a WHRA base that is movable relative to the milling platform. The processing system may comprise a WHRA rail, wherein the WHRA base is movably attached to the WHRA rail to allow the WHRA base to move relative to the milling platform.

In embodiments of the processing system, the at least one SRA comprises a SRA base that is movable relative to the milling platform. The processing system may comprise a SRA rail, wherein the SRA base is movably attached to the SRA rail to allow the at least one SRA to move relative to the milling platform.

In embodiments of the processing system having a plurality of SRAs, the processing system further comprises an additional tool, wherein each of the plurality of SRAs are adapted to interchange the milling tool with the additional tool. The additional tool may comprise an additional milling tool comprising a bit, blade, disc, or drum for cutting, drilling, engraving, grinding, routing or sanding the workpiece. The additional tool may comprise a suction surface to sealingly engage a vacuum pod of the milling platform. The plurality of SRAs may comprise a first SRA and a second SRA spaced on one side of the milling platform, or on opposite sides of the milling platform.

In embodiments of the processing system, the milling platform comprises a milling platform first part and a milling platform second part movably attached to the milling platform first part to allow the milling platform second part to move relative to the milling platform first part and thereby vary at least one horizontal dimension of the milling platform.

In another aspect, the present invention comprises a system (referred to herein as a "control system") for controlling a workpiece handling robotic arm (WHRA) comprising a holding tool to release a workpiece on a milling platform. The control system comprises a plurality of contact position sensors, and a processor. Each of the the plurality of contact position sensors comprises a probe actuable to engage the workpiece. Different ones of the probes engage the workpiece at different workpiece locations, and wherein the plurality of the contact position sensors are configured to collectively generate positional data indicative of a position of the workpiece in at least a two-dimensional plane. The processor is operatively connected to the plurality of contact position sensors and the WHRA. The processor is configured by a non-transitory computer readable medium storing instructions executable by the processor to implement a method comprising: actuating probes of the plurality of contact position sensors to engage the workpiece and generate the positional data; and controlling the WHRA to move the holding tool to a release position for releasing the workpiece on the milling platform, wherein the release position is based at least on the positional data.

In embodiments of the control system, the method comprises controlling the WHRA to move the holding tool to a release orientation for releasing the workpiece on the milling platform, wherein the release orientation is based at least on the positional data.

In embodiments of the control system, the control system is for use with a workpiece that comprises a workpiece first edge extending in a first direction, and a workpiece second edge extending in a second direction substantially perpendicular to the first direction. The plurality of contact position sensors comprises a first contact position sensor comprising a probe actuable to engage the workpiece first edge and configured to measure a position of the workpiece first edge in the second direction. The plurality of contact position sensors further comprises a second contact position sensor comprising a probe actuable to engage the workpiece second edge and configured to measure a horizontal position of the workpiece second edge in the first direction. The plurality of contact position sensors may comprise a third contact position sensor comprising a probe actuable to engage the workpiece first edge and configured to measure a position of the workpiece first edge in the second direction.

In embodiments of the control system, at least one of the contact position sensors comprises a linear variable differential transformer (LVDT) position sensor, or a touch probe.

In another aspect, the present disclosure comprises a system (i.e. referred to herein as a "positioning system") for positioning a vacuum pod movable relative to a milling platform. The positioning system comprises a robotic arm (RA) and a processor. The RA comprises a suction surface to sealingly engage the vacuum pod such that movement of the suction surface causes the vacuum pod to move in unison with the suction surface. The processor is operatively connected to the RA, and configured by a non-transitory computer readable medium storing instructions executable by the processor to implement a method comprising: controlling the RA to move the suction surface into sealing engagement with the vacuum pod at a first position on the milling platform; controlling the RA to move the suction surface with the vacuum pod sealingly engaged thereto from the first position to a second position on the milling platform; and controlling the RA to disengage the suction surface from the vacuum pod at the second position on the milling platform.

In embodiments of the positioning system, controlling the RA to move the suction surface, with the vacuum pod sealingly engaged thereto, comprises lifting the vacuum pod off of the milling platform.

In embodiments of the positioning system, the milling platform comprises a milling platform rail extending in a horizontal first direction, and a milling platform beam extending in a second horizontal direction at a non-zero angle to the first direction, movably attached to the milling platform rail for adjusting a position of the milling platform beam relative to the milling platform rail in the first direction, and supporting the vacuum pod. Controlling the RA to move the suction surface with the vacuum pod sealingly engaged thereto, comprises: controlling the RA to move the suction surface in unison with the milling platform beam in the first direction relative to the milling platform rail; and controlling the RA to move the suction surface in the second direction relative to the milling platform beam.

In embodiments of the positioning system, the non-transitory computer readable medium stores coordinates of the second position of the vacuum pod in association with data describing a geometry of a workpiece to be supported on the vacuum pod.

One or more features of the processing system, the control system and/or the positioning system, and embodiments thereof, as described above may be combined together in a single system as described herein. In particular, the WHRA of the processing system may be the WHRA of the control system. In particular, one of the at least one SRA of the processing system may be the RA of the positioning system, having interchanged the milling tool with the suction surface.

BRIEF DESCRIPTION OF THE DRAWINGS

The foregoing and other aspects of the disclosure will be better appreciated with reference to the attached drawings, as follows.

FIGS. 1 to 23 show perspective views of a first embodiment of a system of the present disclosure for handling and milling a panel, or portions thereof.

FIG. 1 shows a milling platform, an input platform, and output platform, a panel handling robotic arm (PHRA) and a spindle robotic arm (SRA).

FIG. 2 shows a panel handling enclosure partially surrounding the input platform, the output platform, and the PHRA, and a milling enclosure and motorized door surrounding the milling platform and the SRA.

FIG. 3 shows the system viewed from the side of the PHRA with the motorized door in the open position.

FIG. 5 is a functional block diagram showing a processor and memory of the system of FIG. 1 operatively connected to other parts of the system.

FIG. 6 shows the PHRA in a ready position and a panel disposed on the input platform in the input staging area.

FIG. 7 shows the holding tool of the PHRA engaging the panel on the input platform.

FIG. 9 shows the PHRA moving the panel toward the milling platform.

FIG. 10 shows the PHRA releasing the panel on the milling platform.

FIG. 11 shows the SRA performing a milling operation on the panel on the milling platform.

FIG. 12 shows the SRA in a first position relative to the milling platform.

FIG. 13 shows the SRA in a second position relative to the milling platform.

FIG. 14 shows a toolbox in a closed state.

FIG. 15 shows the toolbox of FIG. 14 in an open state, to expose a set of additional tools for the SRA.

FIG. 16 shows the SRA about to engage an additional tool from the toolbox.

FIG. 17 shows the SRA after attaching the additional tool from the toolbox.

FIG. 18 shows the PHRA moving the panel toward the output platform.

FIG. 19 shows the PHRA releasing the panel on the output platform.

FIG. 20 shows PHRA releasing the panel on a panel flipping platform.

FIG. 21 shows the holding tool of the PHRA engaging a reverse side of the panel when exposed by upwards pivoting of the panel flipping platform.

FIG. 22 shows the suction surface of the SRA engaging a vacuum pod of the milling platform to move the vacuum pod and the milling platform beam attached thereto relative to the milling platform rails.

FIG. 23 shows the suction surface of the SRA engaging another vacuum pod of the milling platform to move the vacuum pod relative to one of the milling platform beams.

FIG. 28 is a flow chart of an embodiment of a panel handling and milling method.

FIG. 29 is a flow chart of an embodiment of a panel placement method.

FIG. 30 is a flow chart of a vacuum pod positioning method.

DETAILED DESCRIPTION OF EXAMPLE EMBODIMENTS

Figure 1:
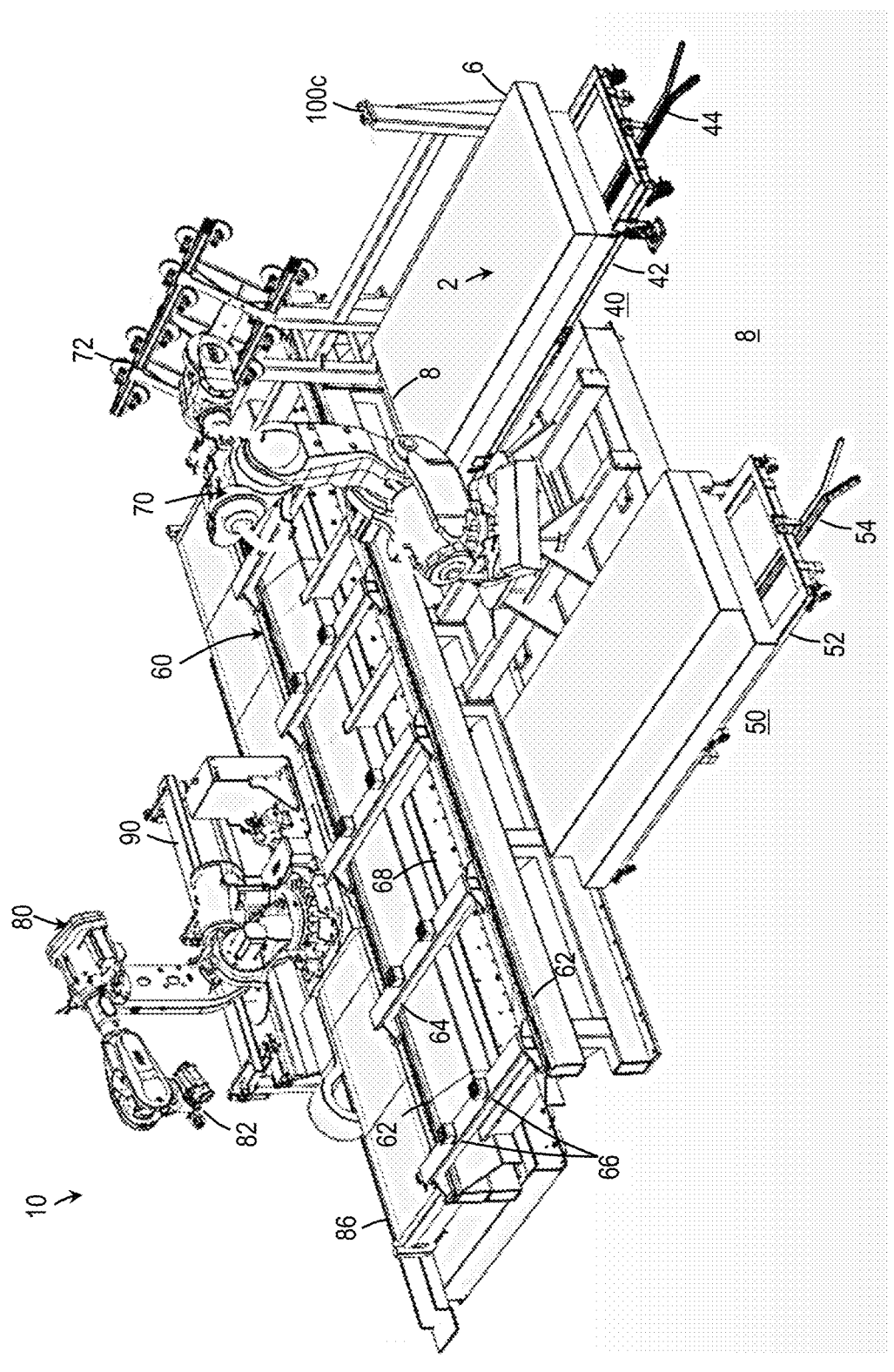

Interpretation.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

As used in this document, "attached" in describing the relationship between two connected parts includes the case in which the two connected parts are "directly attached" with the two connected parts being in contact with each other, and the case in which the connected parts are "indirectly attached" and not in contact with each other, but connected by one or more intervening other part(s) between.

"Memory" refers to a non-transitory tangible computer-readable medium for storing information in a format readable by a processor, and/or instructions readable by a processor to implement an algorithm. The term "memory" includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

"Processor" refers to one or more electronic devices that is/are capable of reading and executing instructions stored on a memory to perform operations on data, which may be stored on a memory or provided in a data signal. The term "processor" includes a plurality of physically discrete, operatively connected devices despite use of the term in the singular. Non-limiting examples of processors include devices referred to as microprocessors, microcontrollers, microcontroller units (MCU), central processing units (CPU), digital signal processors, and field programmable gate arrays (FPGAs).

Aspects of the present disclosure may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor, such that the processor, and a memory storing the instructions, which execute via the processor, collectively constitute a machine for implementing the functions/acts specified in the flowchart and/or block diagram block or blocks.

The flowcharts and functional block diagrams in the figures illustrate the architecture, functionality, and operation of possible implementations of system 10s, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments of the disclosures described herein are exemplary (e.g., in terms of materials, shapes, dimensions, and constructional details) and do not limit by the claims appended hereto and any amendments made thereto. Persons skilled in the art will appreciate that there are yet more alternative implementations and modifications possible, and that the following examples are only illustrations of one or more implementations. The scope of the invention, therefore, is only to be limited by the claims appended hereto and any amendments made thereto.

System.

FIG. 1 shows a perspective view of a first embodiment of a system 10 of the present disclosure for handling and milling a workpiece. "Workpiece" as used herein refers to a piece of material that is to be handled and milled by the system 10, without limitation as to its size, shape or constituent material. "Panel" as used herein refers to a workpiece having a substantially planar form, without limitation as to its size, shape or constituent material. The following described embodiments of the system 10 and related methods are adapted to handle and mill a panel. It will be understood that the term "panel" and the abbreviation "P" (e.g. in PHRA) may be interchanged with the term "workpiece" and the abbreviation "W" (e.g. in WHRA), and the present disclosure may be modified for handling and milling workpieces of types other than panels. Non-limiting examples of such other workpieces may include members that are to be used as a beam, a column or other component of a building. In a non-limiting illustrative embodiment shown in FIG. 1, a panel 2 made of laminated wood sheets and having a substantially rectangular prismatic shape with a first panel edge 6 measuring about 4 feet (1.22 m), a second panel edge 8 measuring about by 8 to 16 feet (2.44 m to 4.88 m), and a thickness of about 2 inches (0.05 m). In general, this embodiment of the system 10 includes an input platform 42 in an input staging area 40, an output platform 52 at an output staging area 50, a milling platform 60, a panel handling robotic arm (PHRA) 70, and at least one spindle robotic arm (SRA) 80. These and other parts of the system 10 are described in greater detail below.

Panel Handling (PH) Enclosure and Milling Enclosure.

Figure 2:
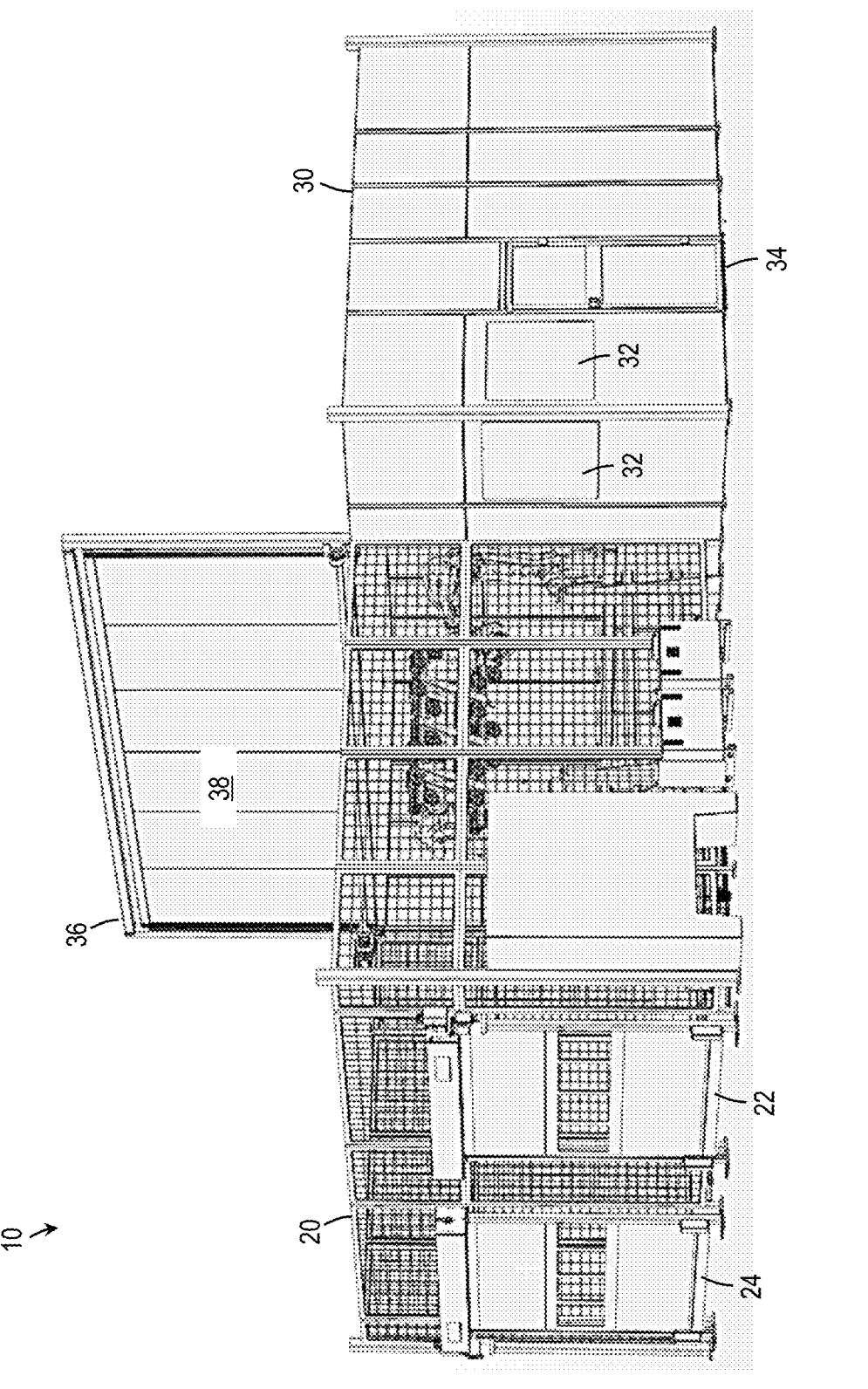
Figure 3:
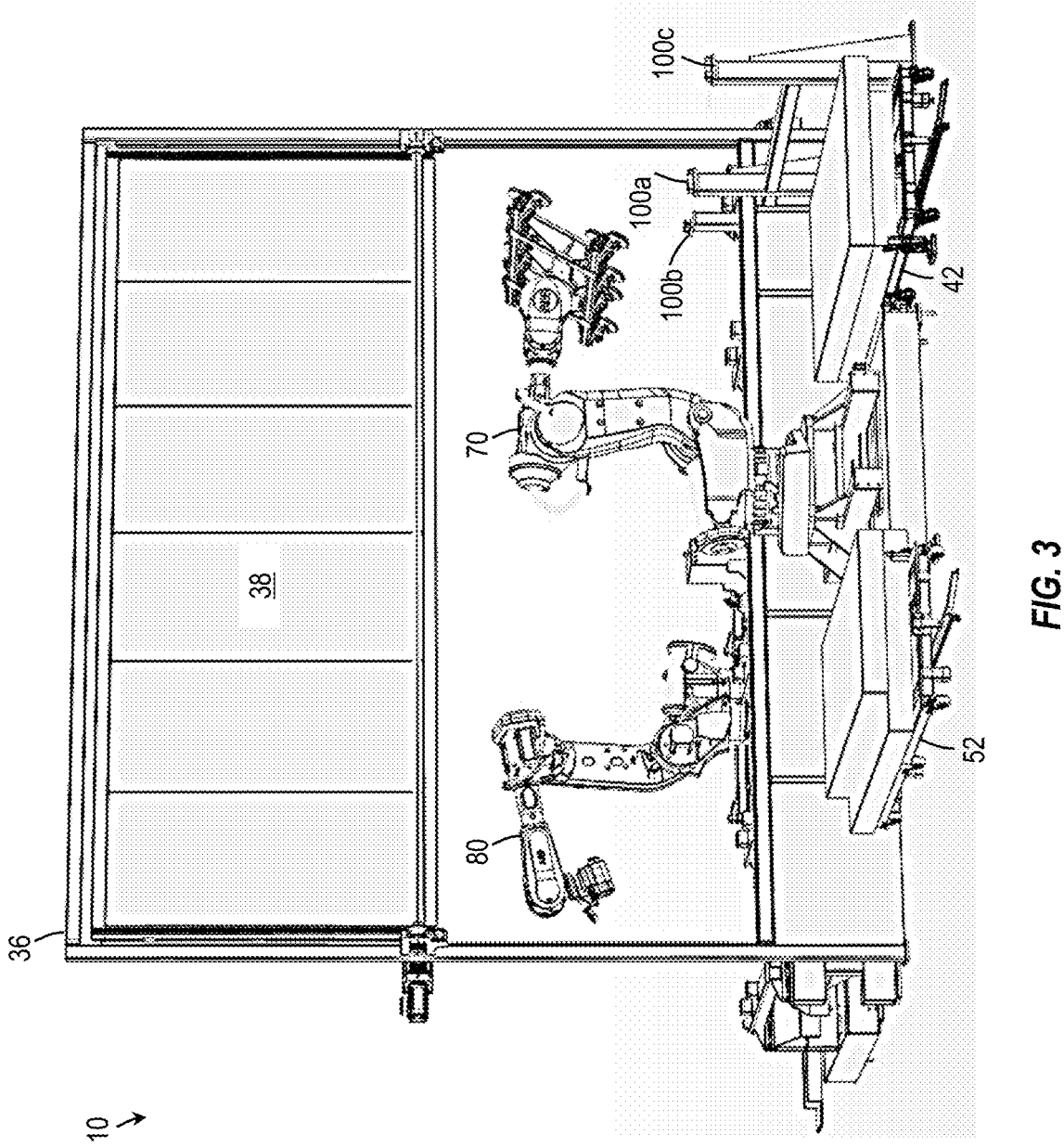

FIG. 2 shows a panel handling (PH) enclosure 20 that partially surrounds the PHRA 70, the input platform 42, and the output platform 52. The PH enclosure 20 may be used as a safety barrier. In this embodiment, the PH enclosure 20 includes a motorized input door 22 and a motorized output door 24 disposed opposite to the input platform 42 and output platform 52, respectively, to allow them to enter and exit from the PH enclosure 20. In this embodiment, the PH enclosure 20 is constructed from a frame structure and wire fencing.

FIG. 2 shows a milling enclosure 30 that surrounds the milling platform 60 and the SRA 80. The milling enclosure

Figure 4A:
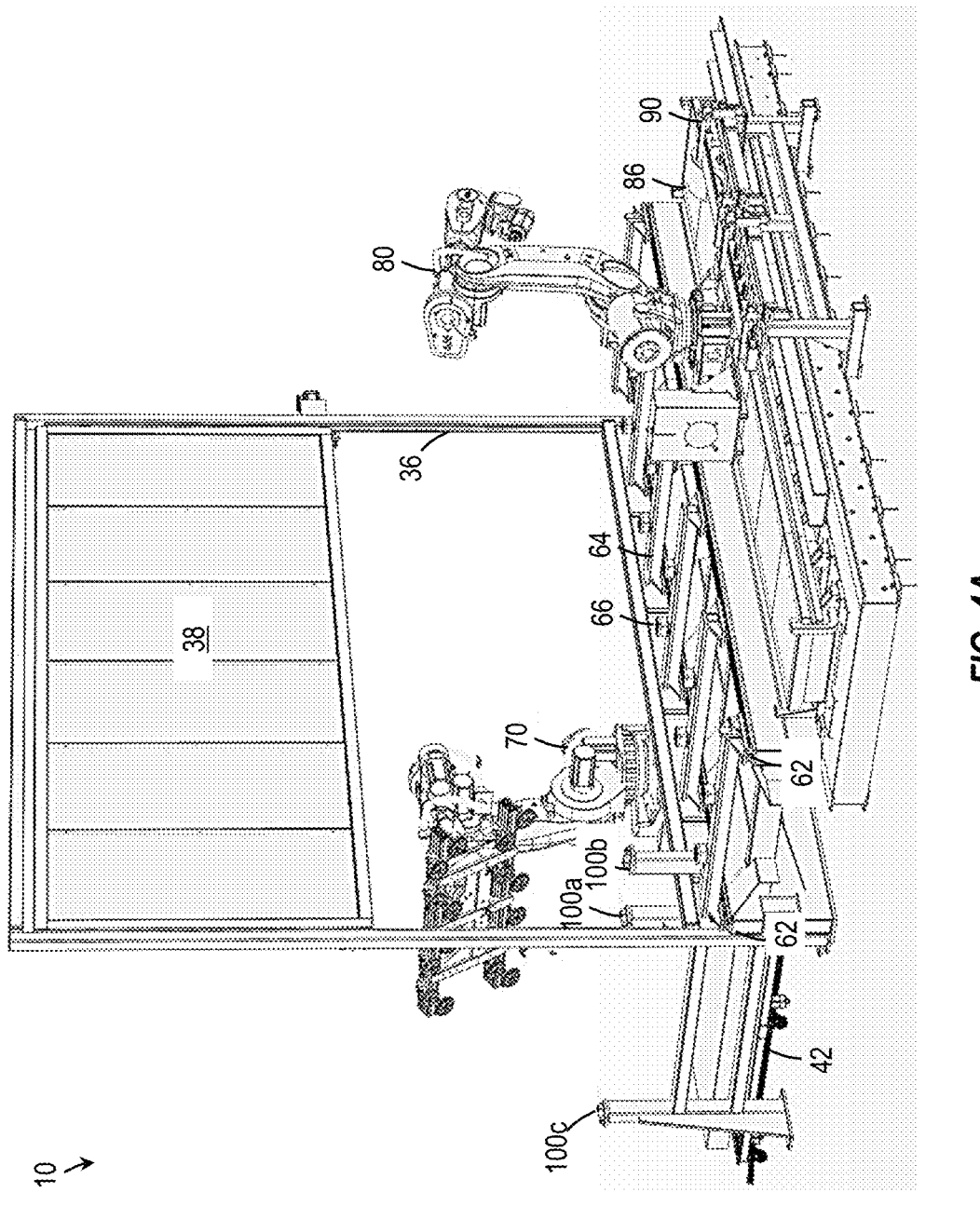
FIG. 4A shows the system viewed from the side of the SRA with the motorized door in the open position.
Figure 4B:
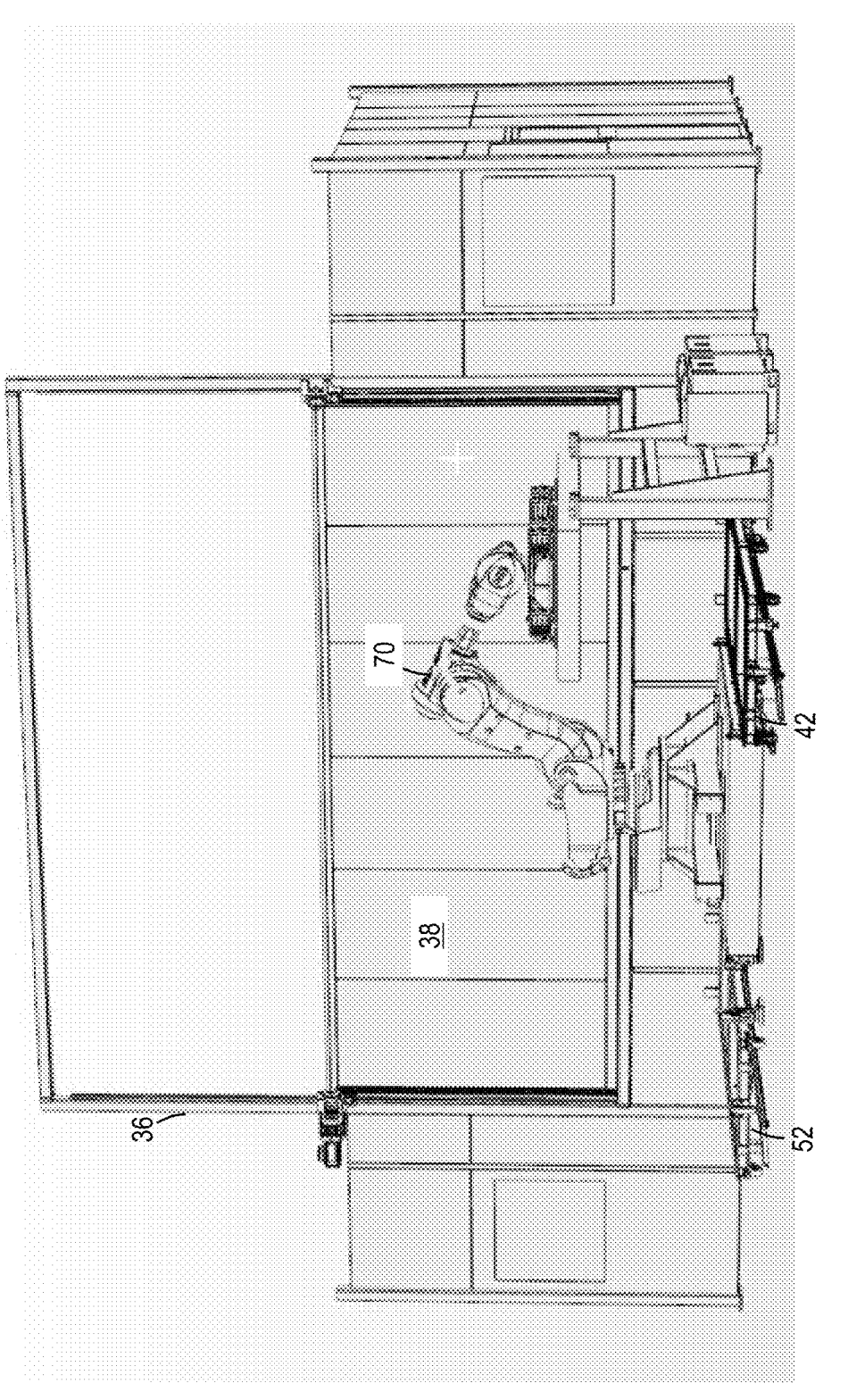
FIG. 4B shows the system viewed from the side of the PHRA with the motorized door in the closed position.

30 may be used as a safety and sound barrier, and to control dust generated by milling operations. In this embodiment, the milling enclosure 30 has milling enclosure windows 32 for an operator to view milling operations, and a milling enclosure door 34 to allow an operator to enter and exit from the milling enclosure 30. In this embodiment, the milling enclosure 30 is constructed from a frame structure and solid panels. The milling enclosure also includes a doorway 36 with a motorized door 38. FIGS. 2 to 4A show the motorized door 38 in an open position in which the doorway 36 allows the PHRA 70 to move the panel via the doorway 36 between the milling platform 60 and the input staging area 40 and output staging area 50. FIG. 4B shows the motorized door 38 in a closed position that closes the doorway 36, and thereby separates the input staging area 40, the output staging area 50, and the PHRA 70 from the milling platform 60 and the SRA 80.

Input and Output Staging Areas and Platforms.

"Input staging area" as used herein refers to an area where one or more panel(s) may be picked up by the PHRA 70 before being subjected to a milling operation by the SRA 80. "Output staging area" as used herein refers to an area where one or more panel(s) are to be released by the PHRA 70 after being subjected to a milling operation by the SRA 80. In one embodiment, the input staging area 40 and the output staging area 50 may simply be different areas of a floor surface 8 in the vicinity of the PHRA 70.

FIG. 1 shows an input platform 42 in the input staging area 40. The purpose of the input platform 42 is to support one or more panel(s) before being subjected to a milling operation by the SRA 80. In this embodiment, the input platform 42 comprises a wheeled cart that can be moved towards and away from the PHRA 70, via the input door 22 of the PH enclosure 20. Therefore, after the input platform 42 has been emptied, it can be moved away from the input staging area 40, loaded with additional panels to be milled and returned to the input staging area 40. In this embodiment, the wheeled cart includes a track following member that engages an input track 44 formed in the floor surface 8. The input track 44 limits movement of the input platform 42 so that the panels stacked thereon will be in a fairly predictable position for pick up by the PHRA 70. In other embodiments, the input platform 42 may comprise a support structure other than a wheeled cart. Such support structure may be stationary or movable toward and away from the PHRA 70 by means other than wheels (e.g. a sliding guide rail).

FIG. 1 shows an output platform 52 in the output staging area 50. The purpose of the output platform 52 is to support one or more panels after being subjected to a milling operation by the SRA 80. In this embodiment, the output platform 52 comprises an output wheeled cart that can be moved towards and away from the PHRA 70 via the output door 24 of the PH enclosure 20. Therefore, after the output platform 52 is loaded with milled panels, it can be moved away from the output staging area 50, unloaded of the milled panels, and returned to the output staging area 50. In this embodiment, the output wheeled cart includes a track following member that engages an output track 54 formed in the floor surface 8. The output track 54 limits movement of the output platform 52, so that the output platform 52 will be in a fairly predictable position to receive milled panels released by the PHRA 70. In other embodiments, the output platform 52 may comprise a support structure other than a wheeled cart. Such support structure may be stationary or movable toward and away from the PHRA 70 by means other than wheels (e.g., a sliding guide rail).

Milling Platform.

A purpose of the milling platform 60 is to support the panel, while the panel is subjected to a milling operation performed by the SRA 80.

FIG. 1 shows an embodiment of the milling platform 60 constructed from a pair of spaced part milling platform rails 62, and a plurality of milling platform beams 64, each of which supports one or more vacuum pods 66. The milling platform rails 62 may be considered to be a first part of the milling platform 60, and each of the milling platform beams 64 may be considered to be a second part of the milling platform 60. The milling platform rails 62 extend in a horizontal first direction, and the milling platform beams 64 extend in a horizontal second direction at a non-zero angle (e.g., substantially perpendicular) to the first direction.

Each of the milling platform beams 64 is movably attached (e.g. by sliding engagement, rollers, or other means) to the milling platform rails 62 for adjusting a position of the milling platform beam 64 relative to the milling platform rails 62 in the first direction. Accordingly, a horizontal dimension of the milling platform 60 may be varied by adjusting the position of one or more of the milling platform beams 64. In embodiments, each of the milling platform beams 64 may be equipped with a brake or lock mechanism to releasably fix the position of the milling platform beam 64 relative to the milling platform rail 62.

In the embodiment shown in FIG. 1, the milling platform rails 62 extend in a horizontal first direction that is substantially perpendicular to the horizontal direction between the PHRA 70 and the SRA 80, and the horizontal second direction is substantially perpendicular to the first direction. As such, the horizontal dimension of the milling platform 60 can be adjusted in the direction substantially perpendicular to the horizontal direction between the PHRA 70 and the SRA 80. In other embodiments, the horizontal first and second directions may differ to enable varying a horizontal dimension of the milling platform 60 in another direction. For example, the milling platform rails 62 may extend in a horizontal first direction that is substantially parallel to the horizontal direction between the PHRA 70 and the SRA 80, and the horizontal second direction may be substantially perpendicular thereto, so that the horizontal dimension of the milling platform 60 can be adjusted in the direction substantially parallel to the horizontal direction between the PHRA 70 and the SRA 80.

Vacuum pods 66 (also referred to as vacuum blocks) are known in the art and commercially available, and do not, by themselves constitute the present invention. A non-limiting example of a vacuum pod 66 suitable for use with the system 10 is commercially available as model no. VCBL-G-K2™ (Schmalz Vacuum Ltd., Mississauga, Canada) and has dimensions of about 120 mm×120 m×100 mm. "Vacuum pod" as used herein refers to a device having a first sealing surface for sealingly contacting a panel, and which defines at least one aperture that can be connected by a vacuum line to a vacuum generator (e.g. a pump or a blower) to generate a vacuum between the first sealing surface and the panel interfaced therewith, such that the panel is suctioned to the first sealing surface. In the embodiment shown in FIG. 1, the first sealing surface is the upper surface of the vacuum pod 66. In embodiments, the vacuum pod 66 may be bi-directional. That is, the vacuum pod 66 also defines a second sealing surface for sealingly contacting a support member (e.g., the upper surface of one of the milling platform beam 64), and which defines at least one aperture that can be connected by a vacuum line to a vacuum generator (e.g. a pump or a blower) to generate a vacuum between the second sealing surface and the support member interfaced therewith, such that the second is suctioned to the support member. The vacuum pod 66 may include or be associated with valves that allow for independent control of the suction force applied at the first sealing surface and the second sealing surface.

In the embodiment shown in FIG. 1, each milling platform beam 64 supports a pair of vacuum pods 66. In other embodiments, each milling platform beam 64 may support only one vacuum pod 66, or a greater number of vacuum pods 66. In this embodiment, each of the vacuum pods 66 is releasably affixed to one of the milling platform beams 64 by the suction force generated by the vacuum source at the second sealing surface. Accordingly, the SRA 80 can lift the vacuum pod 66 off the milling platform beam 64, move the vacuum pod 66 to a different position, and release the vacuum pod 66 at a different position on the same milling platform beam 64 or another one of the milling platform beams 64.

By adjusting the position of the milling platform beams 64 relative to the milling platform rails 62, and by adjusting the position of the vacuum pods 66 on the milling platform beams 64, the vacuum pods 66 can be selectively positioned in one of a plurality of positions in a two-dimensional plane. Accordingly, the milling platform 60 can be configured to accommodate milling panels having a variety of different input geometries (i.e. before the panel is milled) and a variety of different output geometries (i.e. after the panel is milled). For example, the position of one or more milling platform beams 64 relative to the milling platform rails 62 can be adjusted to accommodate panels of different input geometries (e.g. different dimensions or shapes). As another example, the vacuum pods 66 can be positioned to avoid placement beneath a portion of the panel 2 that will be cut away during the milling operation (e.g. to form an opening for a window).

In the embodiment of FIG. 1, the milling platform 60 includes a trough 68 disposed horizontally between the milling platform rails 62, and beneath the milling platform beams 64. The trough 68 is used to collect debris (e.g. dust or cut away parts of the panel 2) generated by the milling operation performed by the SRA 80 on the panel 2. A conveyor belt (not shown) may be provided at the bottom of the trough 68 to convey the collected debris away from the milling platform 60.

In other embodiments, the milling platform 60 may have different forms than shown in FIG. 1. As a non-limiting example, the milling platform 60 may be a vacuum table—i.e., a structure having a planar top to support the panel thereon, and defining a plurality of apertures that can be connected by a vacuum line to a vacuum generator (e.g. a pump or a blower) to generate a suction force on the panel 2 when supported on the planar top.

Robotic Arms in General.

The PHRA 70 and SRA 80 are both robotic arms. In the embodiments shown in FIG. 1, these robotic arms have the same general configuration, but will differ in respect to their end effector. In the embodiment shown in FIG. 1, each of the PHRA 70 and SRA 80 includes a base, a first arm segment, a second arm segment, and an end effector (i.e. a tool). The first arm segment is rotatably attached at a "shoulder joint" to the base for rotating relative to the base about a vertical axis. The first arm segment is also pivotally attached to the base at the "shoulder joint" for pivoting about a horizontal axis. The second arm segment is pivotally attached to the first arm segment at an "elbow joint" for pivoting relative to the elongate axis of the first arm segment. The end effector is pivotally attached to the second arm segment at a "wrist joint" for pivoting relative to the elongate axis of the second arm segment. The end effector is also rotatably attached to the second arm segment at the "wrist joint" for rotating relative to the elongate axis of the second arm segment. Such a robotic arm is known in the art and commercially available (e.g. ABB Ltd.; Zurich, Switzerland), and does not by itself constitute the present invention. In other embodiments, the PHRA 70 and SRA 80 may have fewer or lesser degrees of freedom.

Panel Handling Robotic Arm (PHRA).

Figure 20:
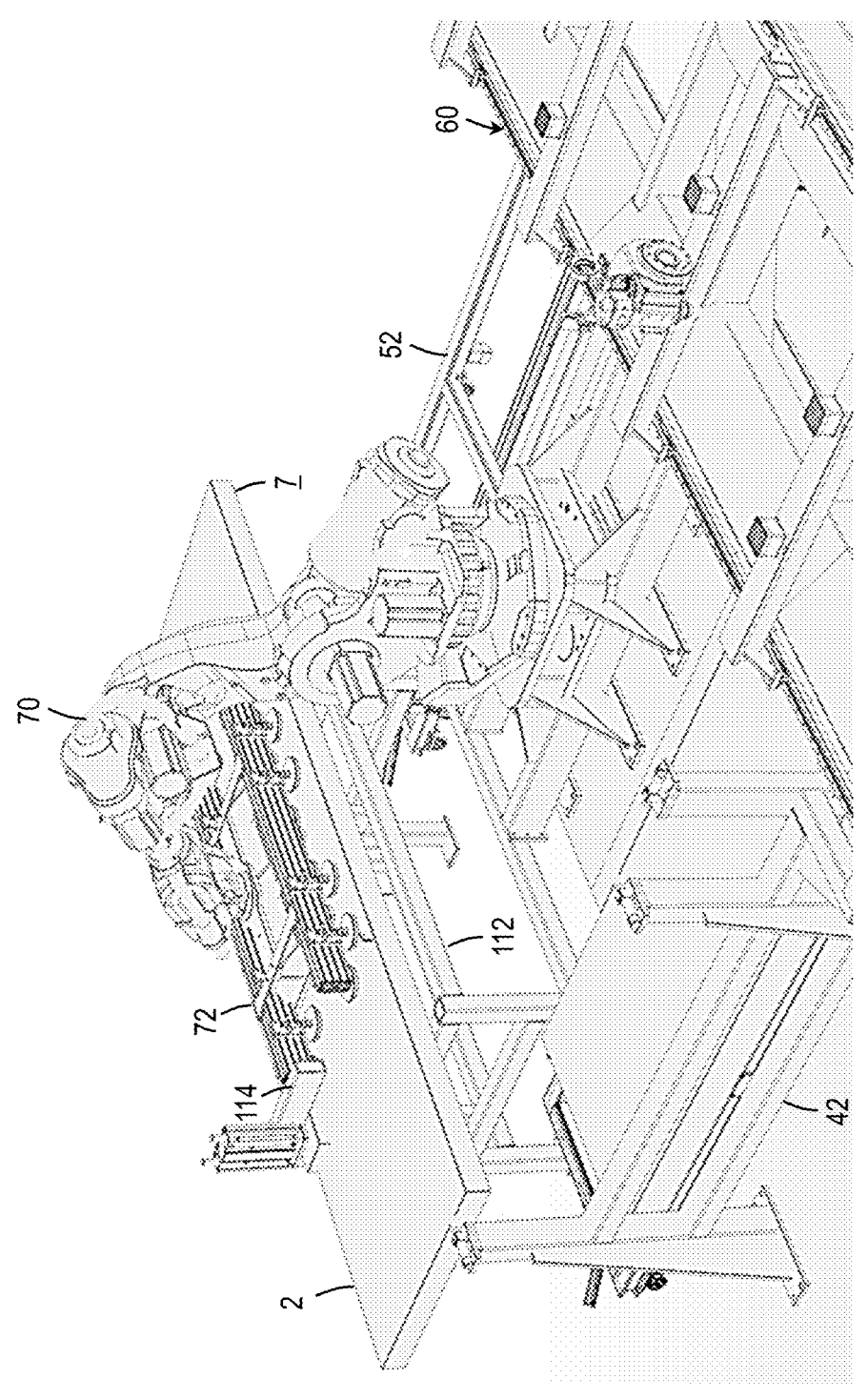
Figure 21:
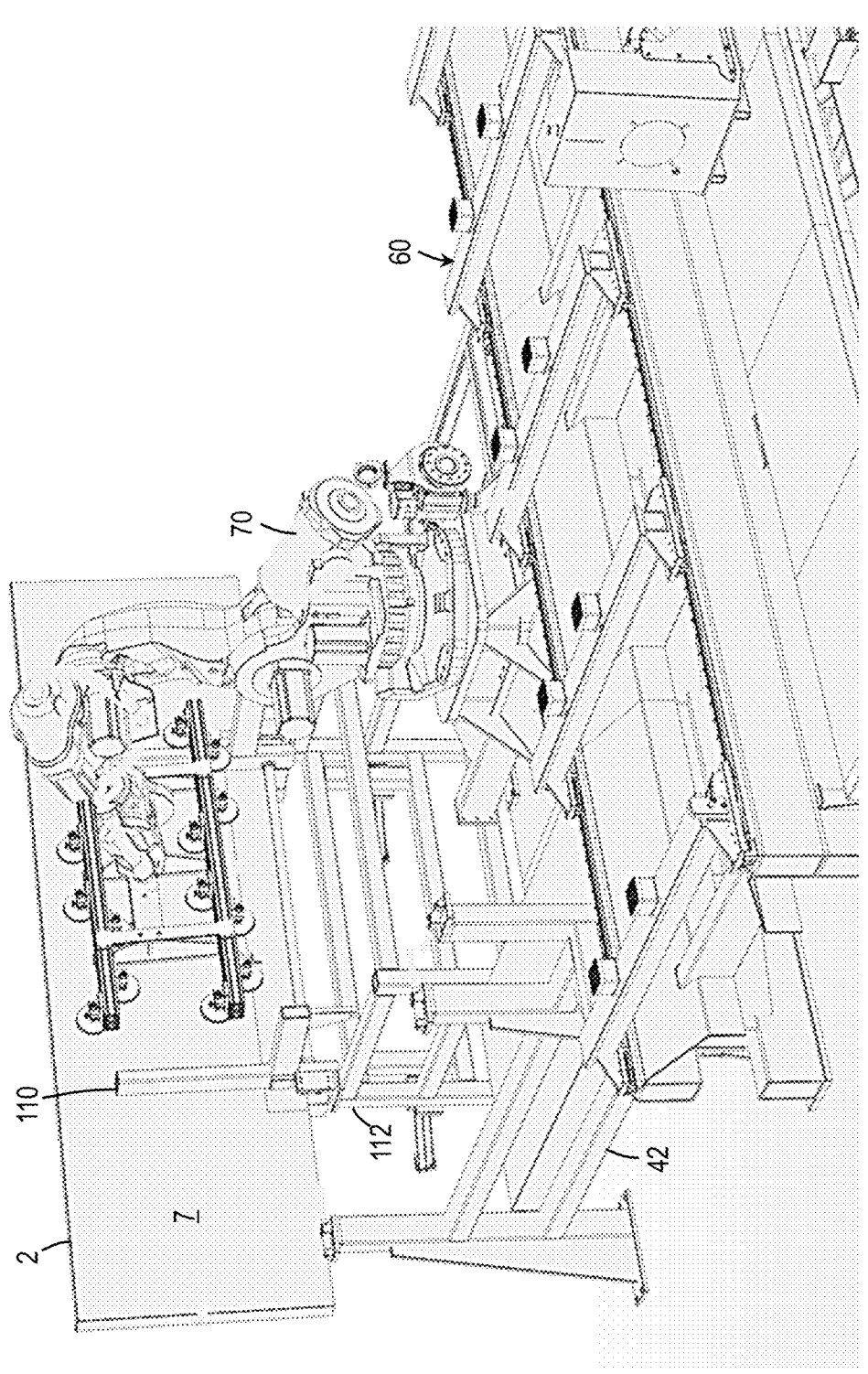

One purpose of the PHRA 70 is to move a panel from the input staging area 40 (e.g. the input platform 42) to the milling platform 60, and from the milling platform 60 to the output staging area 50 (e.g. the output platform 52). In embodiments, the PHRA 70 may also move the panel to and from a panel flipping platform 110 as shown in FIGS. 20 and 21.

The PHRA 70 may have a base, a first arm segment, and second end segment as generally described above. The PHRA 70 end effector is a holding tool 72 that is adapted to releasably hold the panel. In the embodiment shown in FIG. 1, the holding tool 72 includes a vacuum lifter comprising a frame supporting one or more vacuum pads or cups that can be connected to a vacuum generator (e.g. a pump or a blower) to generate a suction force on the panel when interfaced therewith. Vacuum lifters are known in the art and commercially available (e.g. Schmalz Vacuum Ltd., Mississauga, Canada), and do not by itself constitute the present invention. In other embodiments, the holding tool 72 may be implemented by other means for holding the panel such as a plurality of suction cups or a robotic gripping tool.

In the embodiment of the system 10 shown in FIG. 1, the PHRA 70 base is disposed on the same side of the milling platform 60 as the input staging area 40 and the output staging area 50, and horizontally in between the input staging area 40 and the output staging area 50. In other embodiments of the system 10, the PHRA 70 base may have a different position relative to the input staging area 40 and the output staging area 50. For instance, it is possible that the PHRA base 70 is disposed vertically between an input staging area 40 and an output staging area that are vertically spaced apart from each other, such as in a vertical rack or shelve system.

In the embodiment shown in FIG. 1, the PHRA base is fixed to the floor surface 8, and fixed in position relative to the milling platform 60. In other embodiments, the PHRA base may be movable relative to the milling platform 60 to facilitate movement of a panel 2 to and from the milling platform 60. This may be useful for a variety of purposes, including: accommodating panels of different sizes and shapes; placing one or more panels 2 at different positions of the milling platform 60; handling panels that are disposed in a plurality of different input staging areas 40 and/or output staging areas 50; and creating an assembly of systems 10 adapted to perform multiple milling operations on panels in succession. As non-limiting examples, FIGS. 24 and 25 show two alternative embodiments of the system 10, both of which have a PHRA 70 with a movable PHRA base implemented by attaching the PHRA base on wheels to a PHRA rail 74, and providing an electric motor (not shown) to drive the PHRA wheels along the PHRA rail 74.

Figure 24:
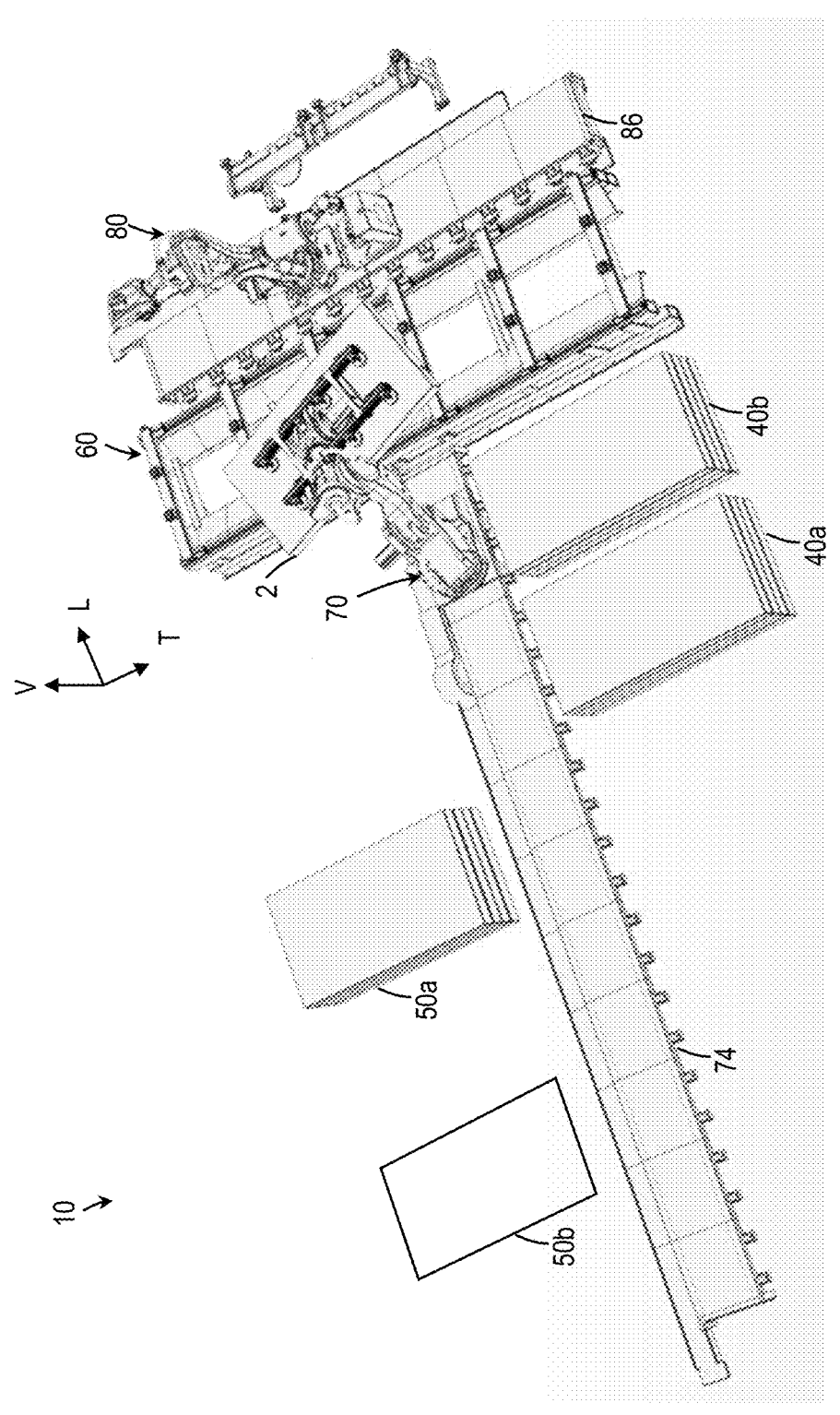
FIG. 24 shows a second embodiment of a system of the present disclosure for handling and milling a panel, which includes a SRA having a SRA base on a SRA track, and a PHRA having a PHRA base that is movable on a PHRA track that is substantially perpendicular to the SRA track.

In the embodiment of FIG. 24, the elongate length of the PHRA track 74 extends in a horizontal longitudinal direction (L) defined by the direction from the PHRA 70 towards the SRA 80, and the elongate length of the milling platform 60 extends in a horizontal transverse direction (T) that is substantially perpendicular to the longitudinal direction (L) as shown by the mutually orthogonal reference axes (L, V, T). The PHRA track 74 and the SRA track 86 extend in elongate directions that are substantially perpendicular to each other. The PHRA base may travel along the PHRA track 74 to pick up panels to be milled from one of a plurality of input staging areas 40a, 40b that are longitudinally spaced apart along the PHRA track 74, and to deposit milled panels at one of a plurality of output staging areas 50a, 50b that are longitudinally spaced apart along the PHRA track 74.

Figure 25:
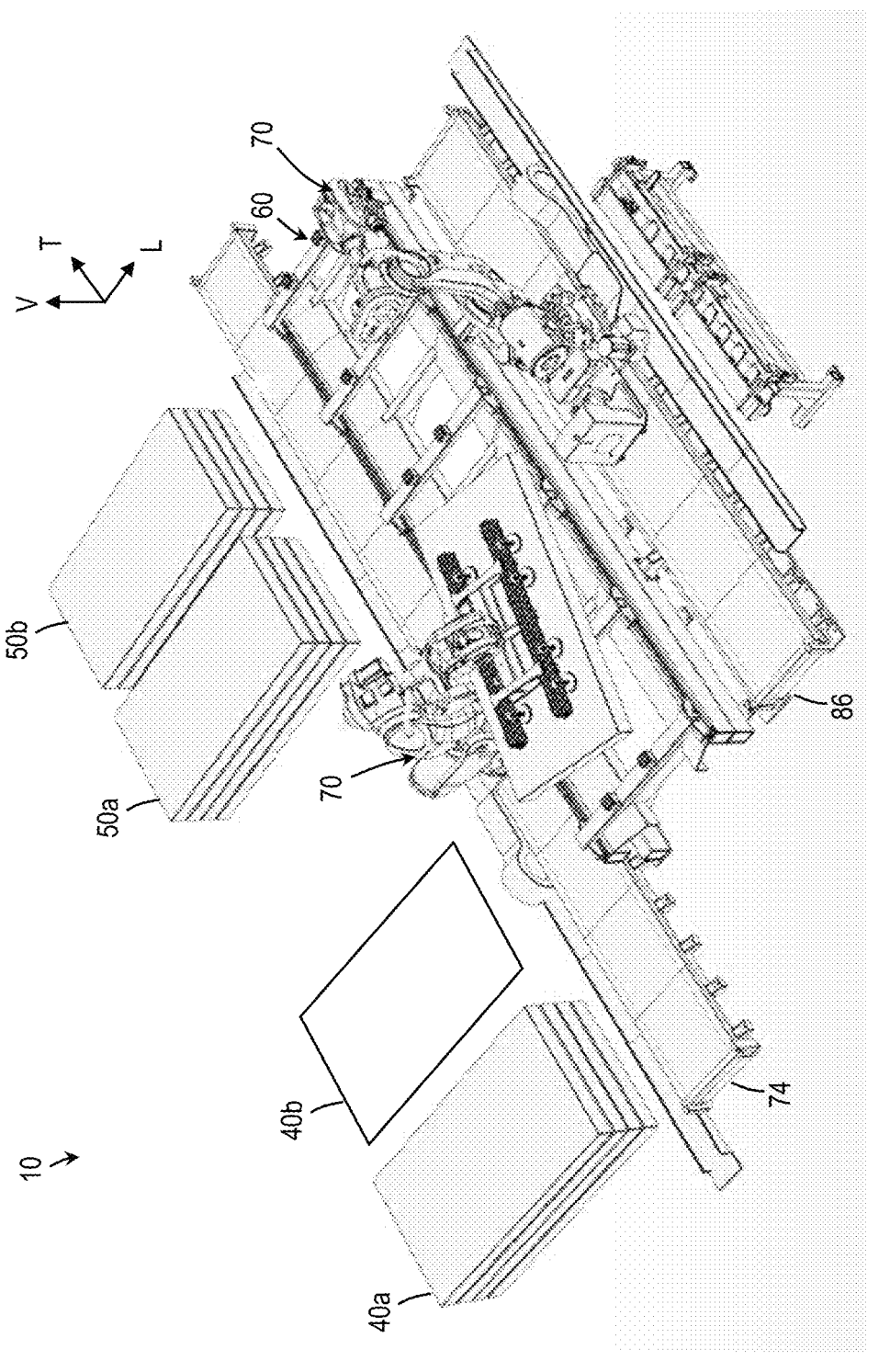
FIG. 25 shows a third embodiment of a system of the present disclosure for handling and milling a panel, which includes a SRA having a SRA base on a SRA track, and a PHRA having a PHRA base that is movable on a PHRA track that is substantially parallel to the SRA track.

In the embodiment of FIG. 25, the elongate length of the PHRA track 74 and the elongate length of the milling platform 60 extend in horizontal transverse directions (T) that are substantially parallel to each other. The PHRA track 74 and the SRA track 86 extend in elongate directions that are substantially parallel to each other. The PHRA base may travel along the PHRA track 74 to pickup panels to be milled from one of a plurality of input staging areas 40a, 40b that are transversely spaced apart along the PHRA track 74, and to deposit milled panels at one of a plurality of output staging areas 50a, 50b that are transversely spaced apart along the PHRA track 74. In still other embodiments (not shown), the PHRA track 74 may have a curved portion.

The instance of the system 10 shown in FIG. 24 or FIG. 25 may be placed side-by-side adjacent to a similar or like second instance of the system 10 (not shown), either in the transverse direction (T) or the longitudinal direction (T). The PHRA 70 of the second instance of the system 10 can pick up panels from the output staging areas 50a, 50b shown in FIG. 24 or FIG. 25 (i.e. the output staging areas 50a, 50b are used as input staging areas by the second instance of the system 10) to perform a different milling operation using the SRA 80 of the second instance of the system 10. The PHRAs 70 of the two instances of the system 10 may share a common PHRA track 74. Alternatively, the PHRA 70 of instance of the system shown in FIG. 24 or FIG. 25 may also be the PHRA 70 of the second instance of the system 10. That is, a single PHRA 70 services the two SRAs 80 of the two instances of the system 10.

Spindle Robotic Arm (SRA).

One purpose of the SRA 80 is to perform a milling operation on the panel 2 when the panel 2 is supported on the milling platform 60. In embodiments, the SRA 80 may also be used to position the vacuum pods 66 of the milling platform 60.

The SRA 80 may have a base, a first arm segment, and second end segment as generally described above. In the embodiment show in FIG. 1, the SRA 80 end effector includes a chuck that releasably grips a milling tool 82 that is adapted to mill the panel. "Milling", "mill" and like terms as used herein refer to an operation that removes material from the panel. As non-limiting illustrative examples, milling may include cutting, drilling, engraving, grinding, routing or sanding the panel. In embodiments, the milling tool 82 may comprise a bit, blade, disc, or drum for cutting, drilling, engraving, grinding, routing or sanding the panel.

Figures 14, 15:
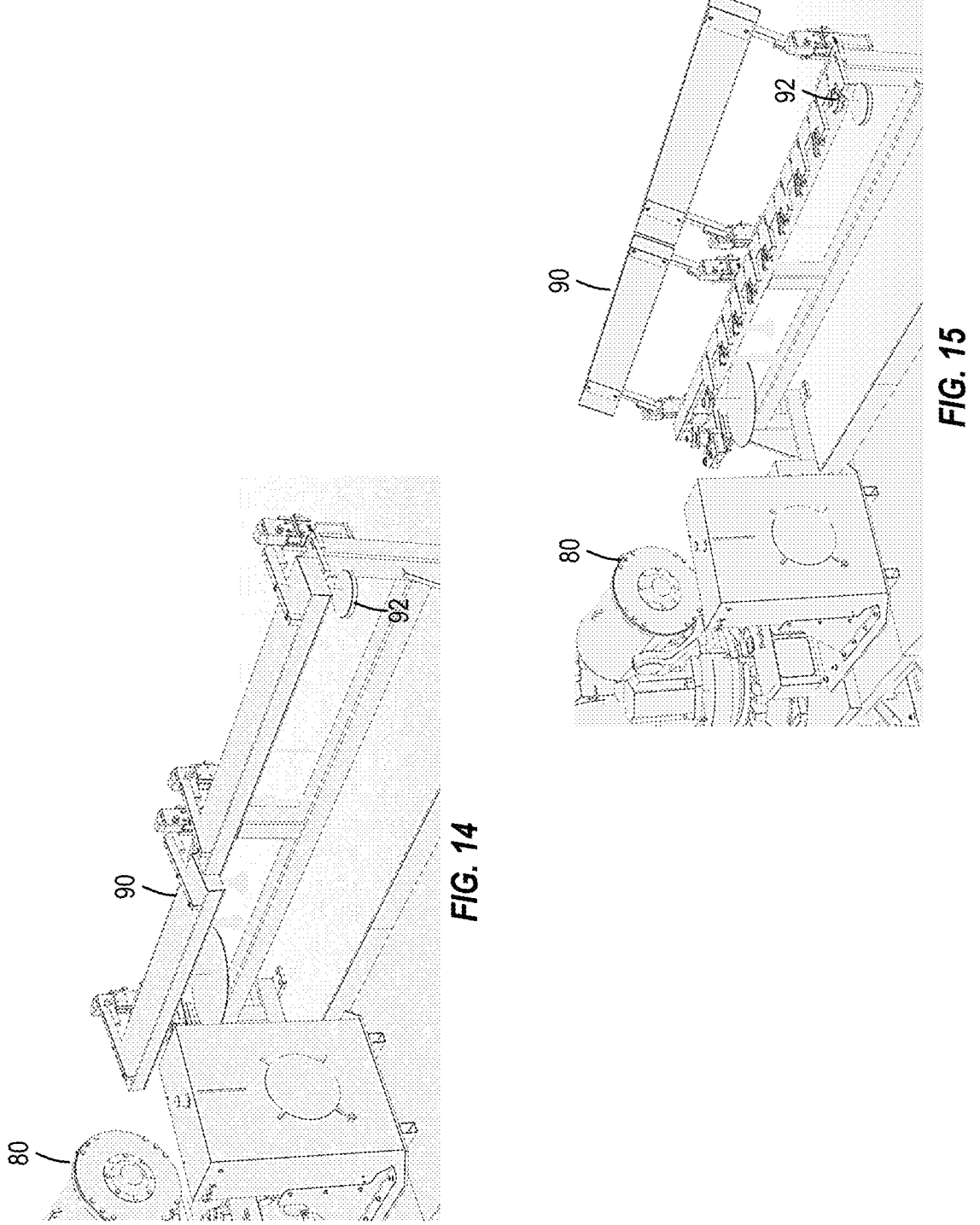
Figure 22:
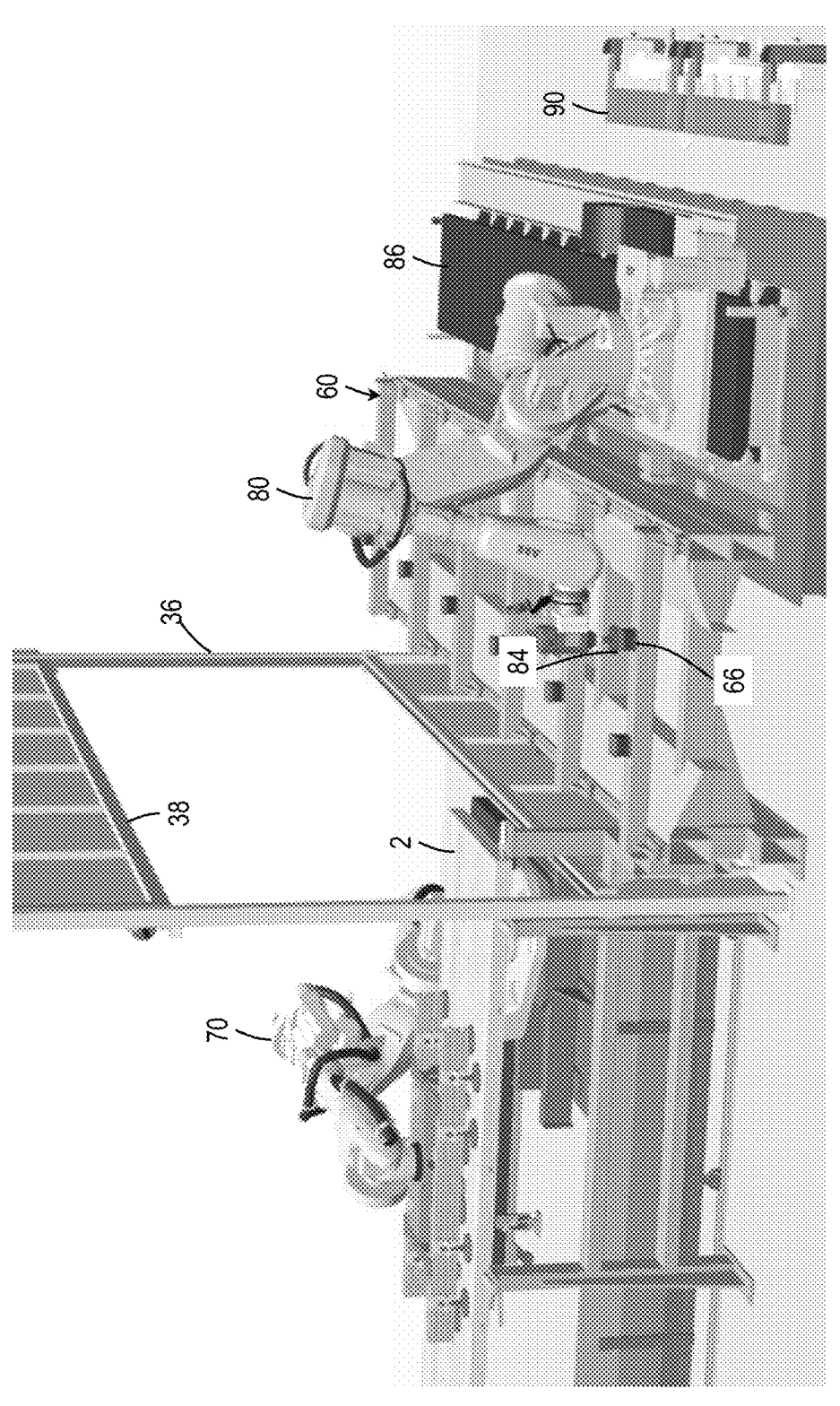
Figure 23:
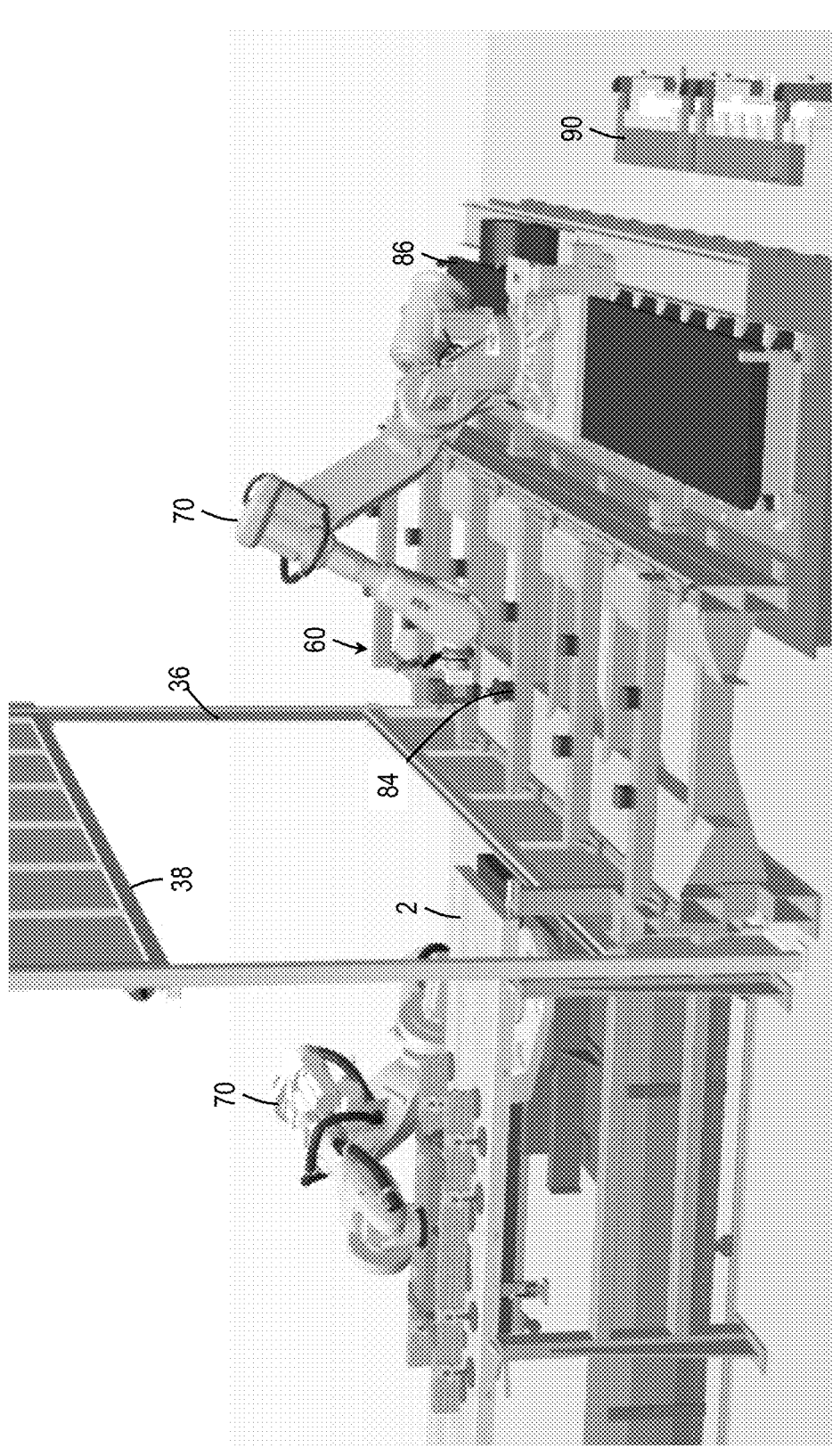

The chuck of the SRA 80 may be actuated to release one milling tool 82, and grip a different milling tool 82 to perform a different milling operation. Accordingly, in one embodiment, as shown in FIGS. 14 and 15, the system 10 includes a toolbox 90 containing a set of at least one additional tool 92 that may be interchangeably gripped by the chuck. The set of additional tools may include a variety of different milling tools. In embodiments in which the SRA 80 is used to position the vacuum pods 66 of the milling platform 60, the additional tools may also include a suction surface 84 as shown in FIGS. 22 and 23 that is used to engage the panel contact surface of the vacuum pods 66.

In the embodiment shown in FIG. 1, the milling platform 60 is disposed between the PHRA base and the SRA base. In other embodiments of the system 10, the SRA base may have a different position relative to the milling platform 60 and the PHRA 70 base.

Figure 12:
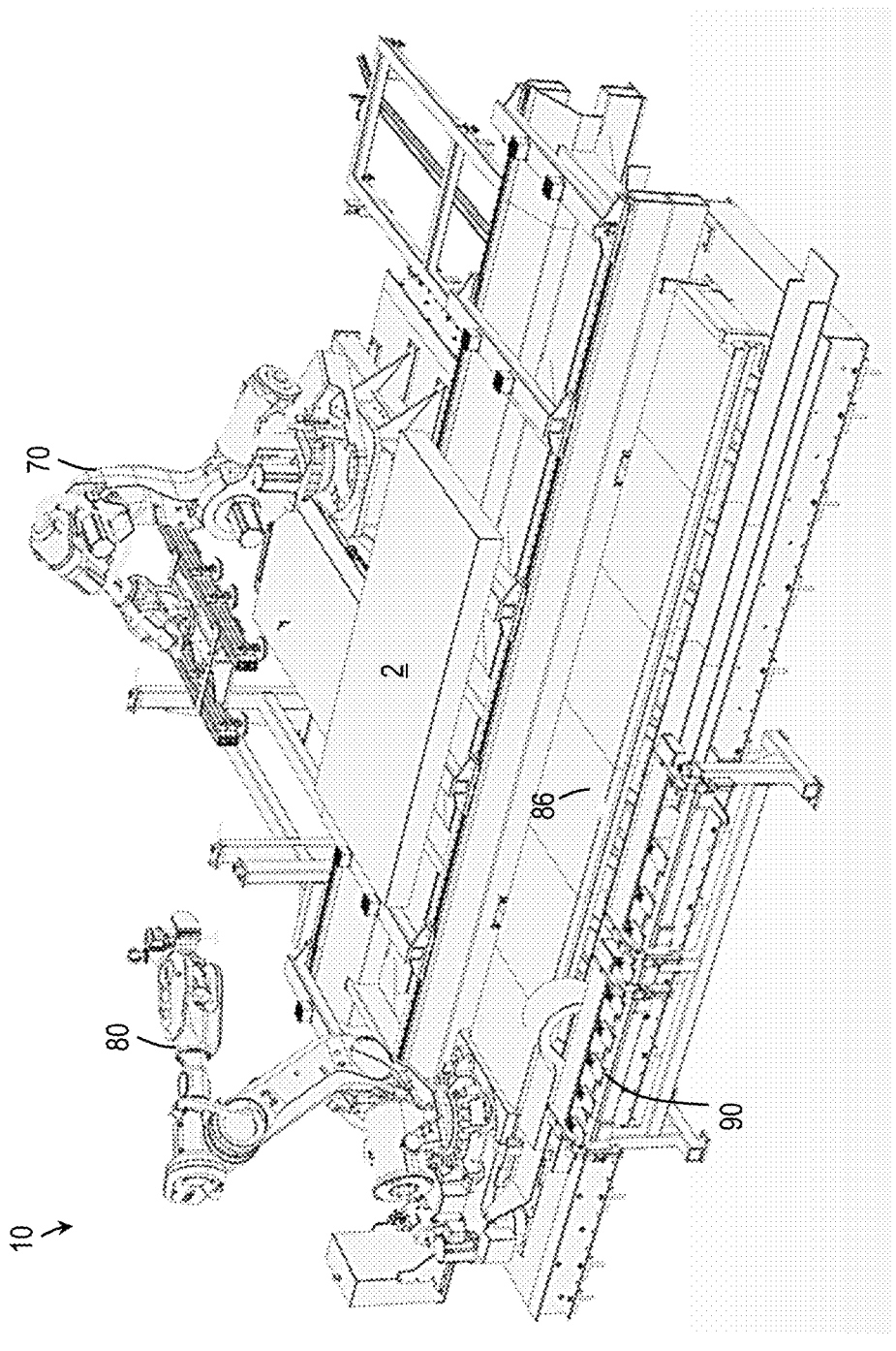
Figure 13:
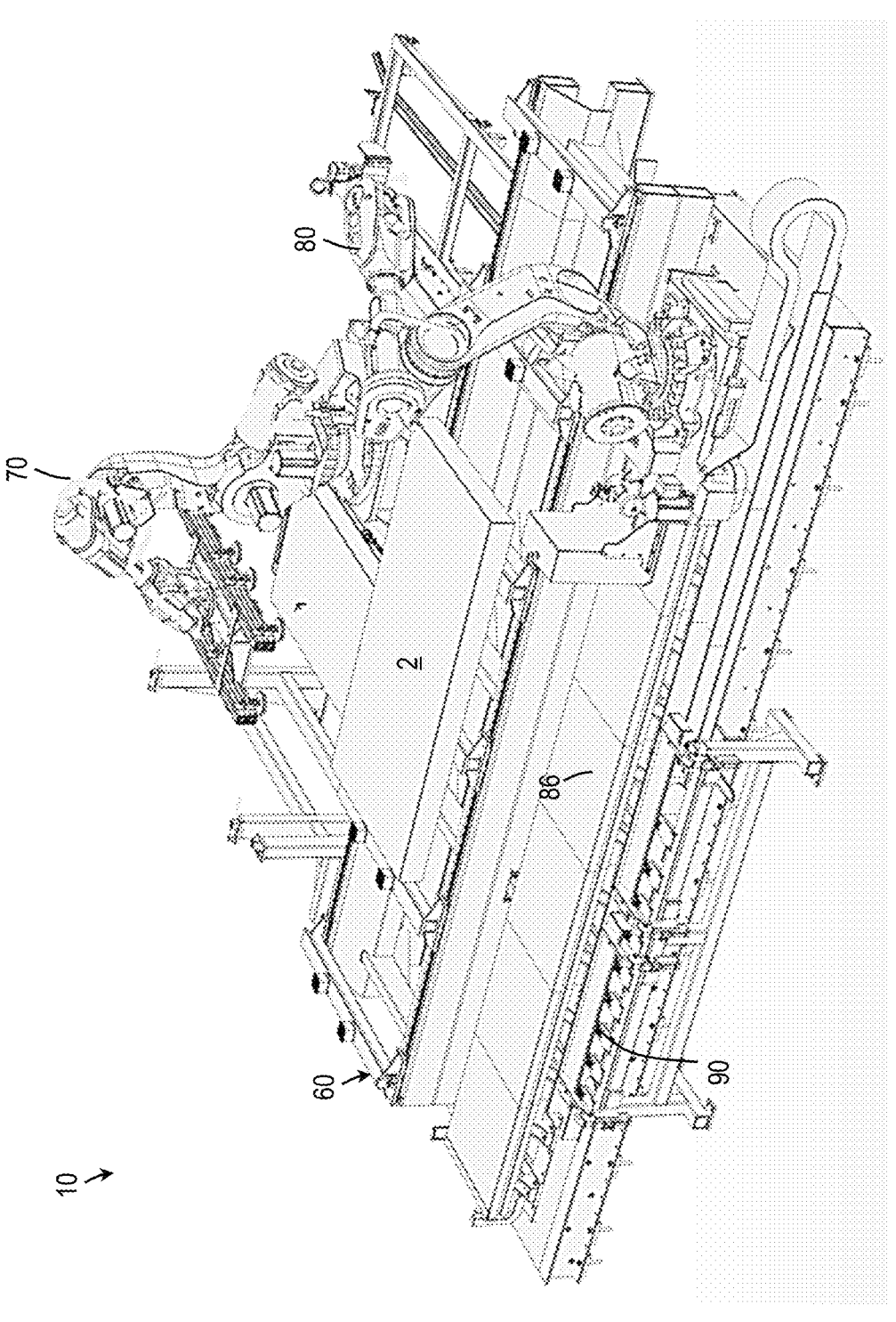

In the embodiment shown in FIG. 1, the SRA base is movable relative to the milling platform 60 to facilitate performing the milling operation over the entire panel when supported on the milling platform 60. In this embodiment, the movable SRA base is implemented by attaching the SRA base on wheels to a SRA rail 86, and providing an electric motor (not shown) to drive the SRA 80 wheels along the SRA rail 86. For example, FIGS. 12 and 13 show the SRA 80 moved to opposite ends of the SRA rail 86. In other embodiments (not shown), the SRA base may be fixed in position relative to the milling platform 60.

Figure 26:
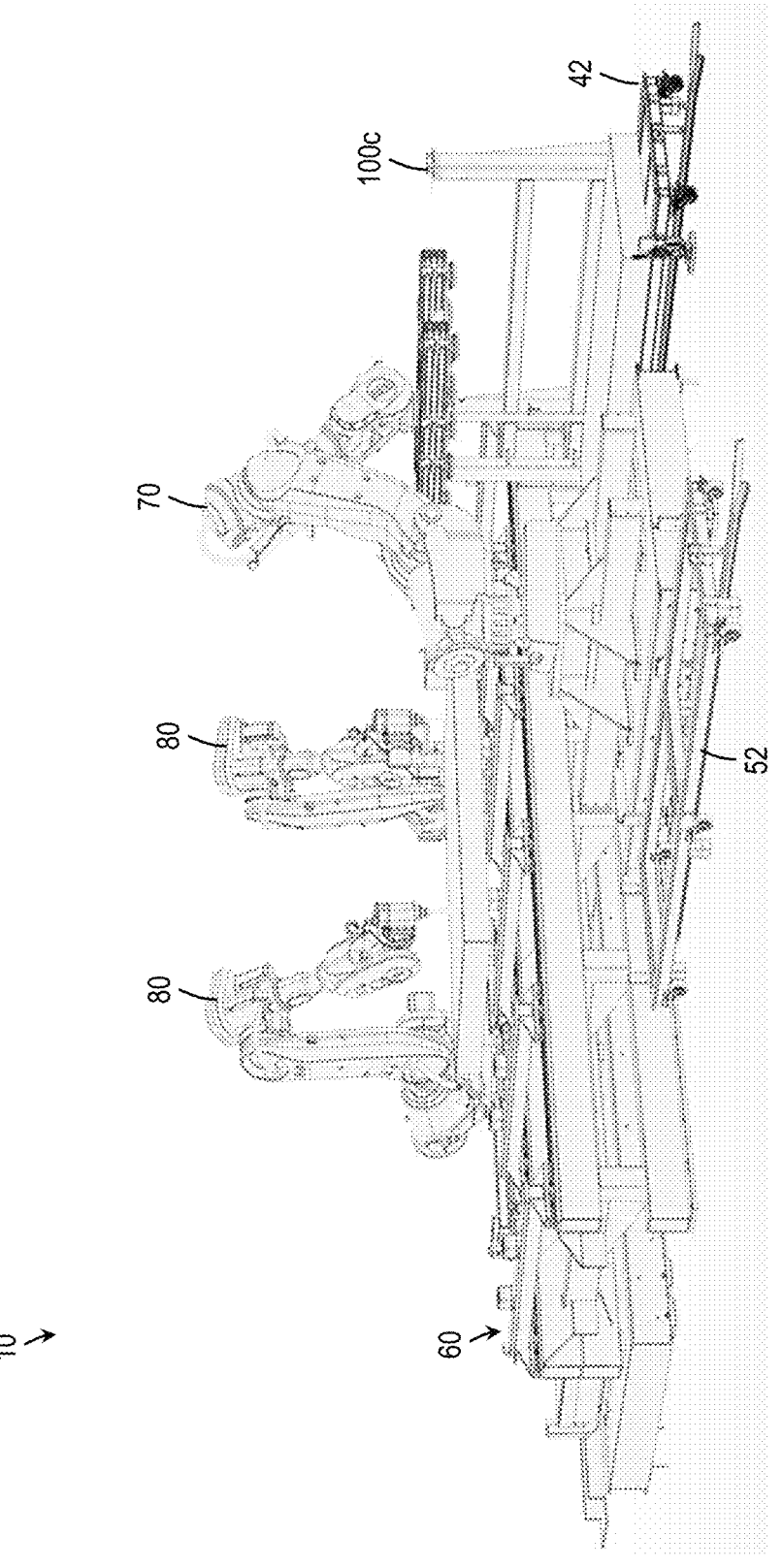
FIG. 26 shows a fourth embodiment of a system of the present disclosure for handling and milling a panel, which includes a plurality of SRAs on one side of the milling platform.
Figure 27:
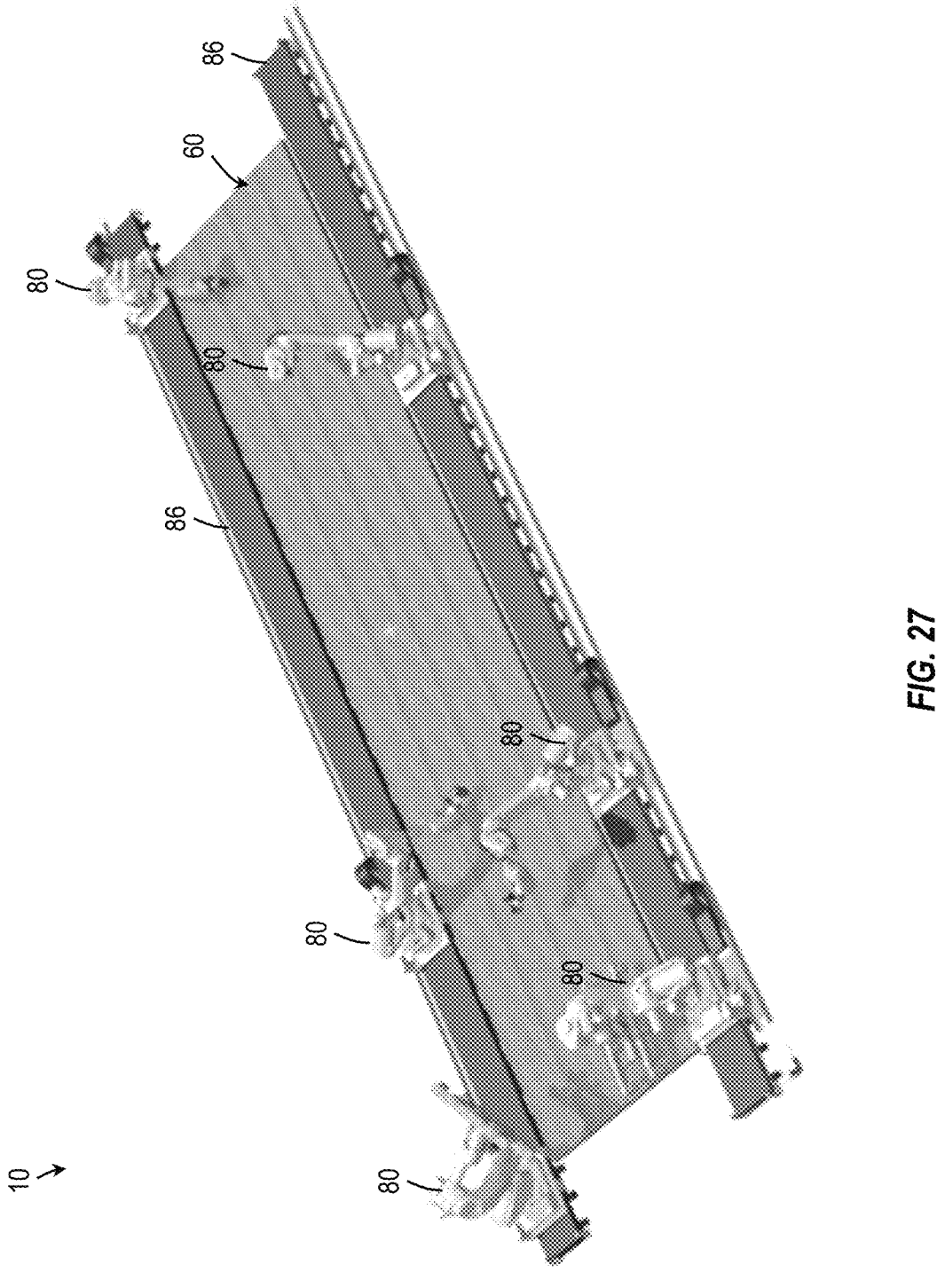
FIG. 27 shows part of a fifth embodiment of a system of the present disclosure for handling and milling a panel, including a plurality of SRAs on both sides of the milling platform.

In the embodiment shown in FIG. 1, the system 10 has only one SRA 80. In other embodiments, the system 10 may include a plurality of SRAs 80. In comparison with a system 10 having only one SRA 80, systems having a plurality of SRAs may allow for reduced cycle times for milling operations since the SRAs 80 may simultaneously perform milling operations on different portions of the panel. Alternatively, the milling platform 60 may be dimensioned to simultaneously support a plurality of panels 2, and different ones of the SRAs 80 may simultaneously perform milling operations on different ones of the panels 2. As the milling of the panels 2 by the SRAs 80 (as opposed to the handling of the panels 2 by the PHRA 70) may be rate-limiting in the processing of the panels, the utilization of the PHRA 70 can be maximized by handling multiple panels for multiple SRAs 80. As a non-limiting example, FIG. 26 shows an embodiment of the system 10 having two SRAs 80 on one side of the milling platform 60. FIG. 27 shows part of another embodiment of the system 10 having six SRAs 80 in total, with three SRAs 80 on one side of the milling platform 60, and three SRAs 80 on an opposite side of the milling platform 60. In this embodiment, the PHRA base of the PHRA 70 (not shown) may be on the same side of the milling platform 60 as some of the SRAs 80. In both FIGS. 26 and 27, the SRAs 80 are movable relative the milling platform 60 by attachment to a milling platform rail 86. In embodiments of the system 10 having a plurality of SRAs 80, each of the SRAs 80 may be adapted to interchange its respective milling tool 82 with a different tool from a shared set of additional tools such as tools contained in the toolbox 90 shown in FIGS. 14 and 15.

Contact Position Sensors.

In the embodiment shown in FIG. 1, the system 10 includes a plurality of contact position sensors 100. "Contact position sensor" as used herein refers to a device having a probe that can be actuated to engage the panel, and generate a signal that can be processed by a processor 120 to determine the position of the probe contacted with the panel.

In one embodiment, a contact position sensor comprises a linear variable differential transformer (LVDT) position sensor. LVDT position sensors are known in the art and commercially available, and do not, by themselves constitute the present invention. In general, a LVDT position sensor includes a housing, containing internal solenoid coils, and an internal core that attached to an external probe. By applying a voltage to the solenoid coils, the core and the attached probe are actuable linearly with respect to the housing to contact an object (e.g. a panel 2), which in turn causes a change in an induced voltage in the solenoid coils.

A differential between the voltages in the solenoid coils is used to generate a signal that can be processed by a processor 120 to determine the position of the probe in contact with the object.

In another embodiment, a contact position sensor comprises a touch probe or a touch trigger probe. Touch probes are known in the art and commercially available, and do not, by themselves constitute the present invention. In general, a touch probe includes a probe (or stylus). When the probe is moved (e.g. using a motor drive) into contact with an object (e.g. a panel 2), the probe is displaced and triggers an electromechanical sensor (e.g. an electromechanical switch or a piezoelectric sensor) to generate a signal that can be processed by the processor 120 to determine the position of the probe. A non-limiting example of a touch probe that is suitable for use in the system 10 is commercially available as model no. RMP60™ (Renishaw PLC, United Kingdom).

Figure 8A:
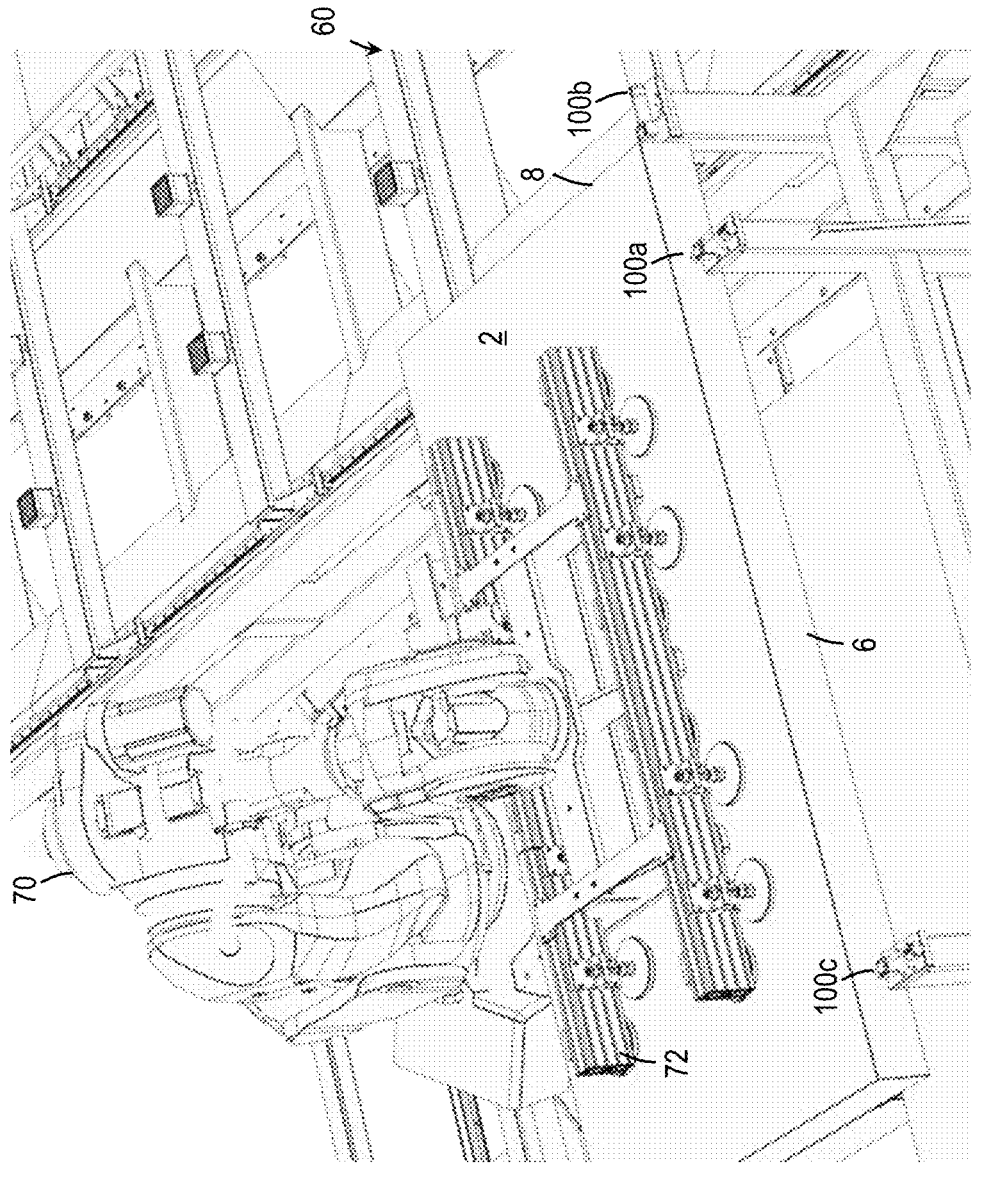
FIG. 8A shows the PHRA holding the panel, with the panel edges in proximity to probes of the contact position sensors.

A purpose of the contact position sensors 100 is to collectively generate positional data indicative of the position of the panel 2 in a two-dimensional plane. In embodiments, that two-dimensional plane is substantially coplanar with the panel, when the panel 2 is held by the holding tool 72 of the PHRA 70, such as shown in FIG. 8A. This positional data is used to control a release position, and in embodiments, a release orientation of the holding tool 72 when it releases the panel on the milling platform 60, as described below for the panel placement method.

In the embodiment shown in FIG. 8A, the system 10 includes three contact position sensors 100a, 100b, and 100c supported by a frame above the input platform 42. The three contact position sensors 100a, 100b and 100c are intended to be used with a panel 2 having a panel first edge 6 extending in a horizontal first direction, and a panel second edge 8 extending in a horizontal second direction substantially perpendicular the first position.

The first contact position sensor 100a has a probe that is actuable to engage the panel first edge 6 to measure a horizontal position of the panel first edge 6 in the second direction. The second contact position sensor 100b has a probe that is actuable to engage the panel second edge 8 to measure a horizontal position of the panel second edge 8 in the first direction. The positional data generated by the first contact position sensor 100a and the second position sensor is sufficient to determine a reference position of the panel in a Cartesian plane. The processor 120 can relate the reference position of the panel 2 to the position of the holding tool 72 of the PHRA 70.

The third contact position sensor 100c has a probe that is actuable to engage the panel first edge 6 to measure a horizontal position of the panel first edge 6 in the second direction. By use of a trigonometric relationship, the positional data generated by the first contact position sensor 100a and the third contact position sensor 100c, and the known distance between the first contact position sensor 100a and the third contact position sensor 100c are sufficient to determine a reference orientation of the panel about an axis perpendicular to the Cartesian plane. The processor 120 can relate the reference orientation of the panel 2 to the orientation of the holding tool 72 of the PHRA 70.

In other embodiments, the system 10 may have only two contact position sensors 100. In order to determine the position of the panel in a two-dimensional plane, it is sufficient that the contact position sensors 100 measure positions of the panel in non-parallel directions. In order to determine the orientation of the panel in a two-dimensional plane, the use of two contact position sensors 100 may also be sufficient if the geometry of the panel is known or assumed. The configuration of the contact position sensors 100 may be adapted for panels having geometries other than rectangular.

Panel Flipping Platform.

In the embodiment shown in FIGS. 20 and 21, the system 10 includes a panel flipping platform 110 (see FIG. 21). A purpose of the panel flipping platform 110 is to allow the holding tool 72 of the PHRA 70 to engage a reverse side 7 of the panel 2 as opposed to a front side of the panel 2 opposite to the reverse side 7. This allows the PHRA 70 to release the panel 2 with either of its front or reverse sides facing upward on the milling platform 60 so that each of the front side and the reverse sides 7 of the panel can be subject to a milling operation. In the embodiment shown in the FIGS. 20 and 21, the panel flipping platform 110 is pivotably attached by hinges to a panel flipping support frame 112 such that the panel flipping platform 110 is pivotable to expose a reverse side 7 of the panel to the holding tool 72 of the PHRA 70. A panel flipping bracket 114 prevents the panel 2 from falling off of the panel flipping platform 110. In this embodiment, the panel flipping platform 110 is pivotable about a horizontal axis. In other embodiments, the panel flipping platform 110 may be pivotable about an axis having a non-horizontal orientation.

Processor and Memory.

Figure 5:
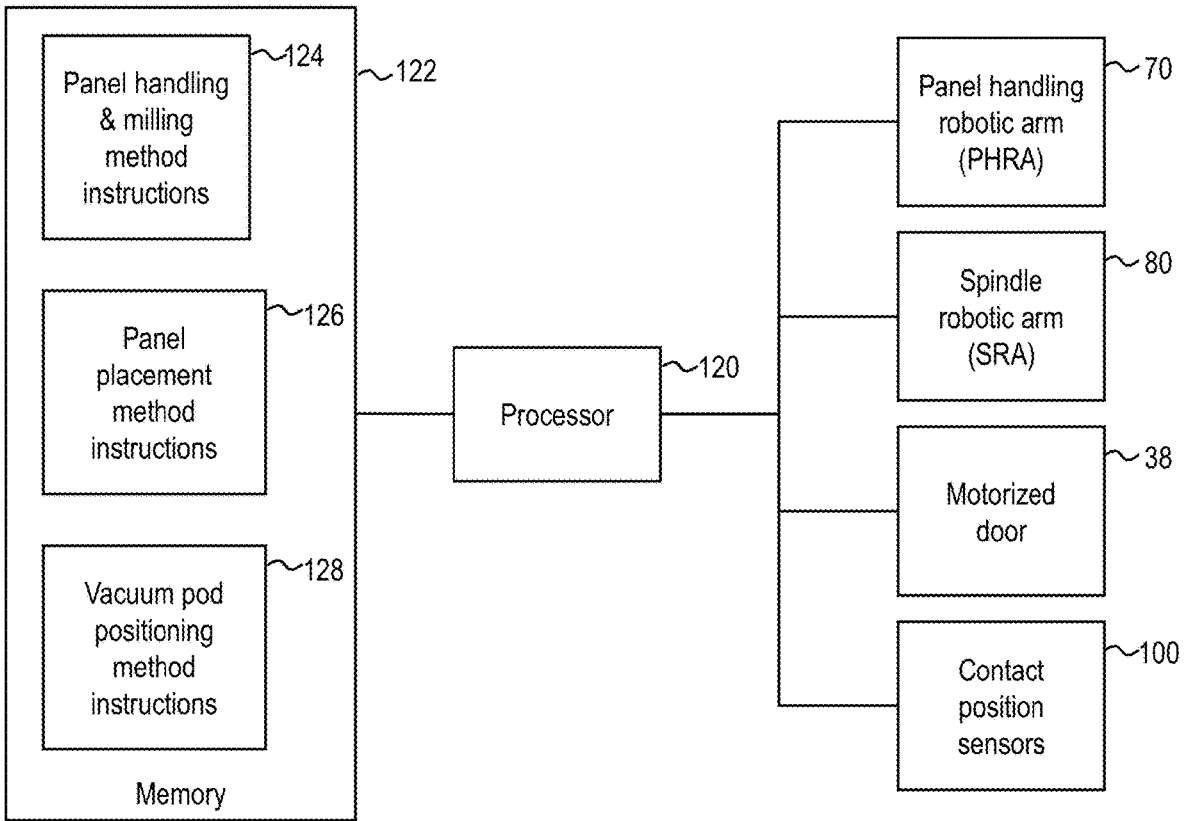

FIG. 5 shows a functional block diagram of the system 10 including a processor 120 and memory 122 in relation to the motorized door 38, PHRA 70, SRA 80, and the contact position sensors 100. The connecting lines between the blocks show operative connection between them and represent wired and/or wireless connections for transmission of data and/or control signals. Although FIG. 5 shows the processor 120 and the memory 122 by single blocks, the processor 120 and the memory 122 may include a plurality of components or sub-components that are operatively connected to each other. For example, each of the processor 120 and the memory 122 may include a plurality of components that are physically discrete and remote from each other, but operatively connected together (e.g., by wire or wireless connections, and/or a communications network such as an intranet or the Internet) in accordance with distributed computing techniques known in the art. For example, part of the processor 120 and memory 122 may be implemented by a processor 120 and storage media of a server or computer workstation while other parts of the processor 120 and the memory 122 may be implemented by microcontroller units and associated firmware that are physically integrated with the motorized door 38, PHRA 70, the SRA 80, and/or the contact position sensors 100.

The memory 122 may be considered as a computer-program product of the present disclosure. The memory 122 stores one or more sets of instructions that are executable by the processor 120 to implement methods as described below. The sets of instructions may include panel handling and milling method instructions 124, panel placement method instructions 126, and vacuum pod positioning method instructions 128, to implement methods as described below.

Panel Handling and Milling Method.

Figure 6:
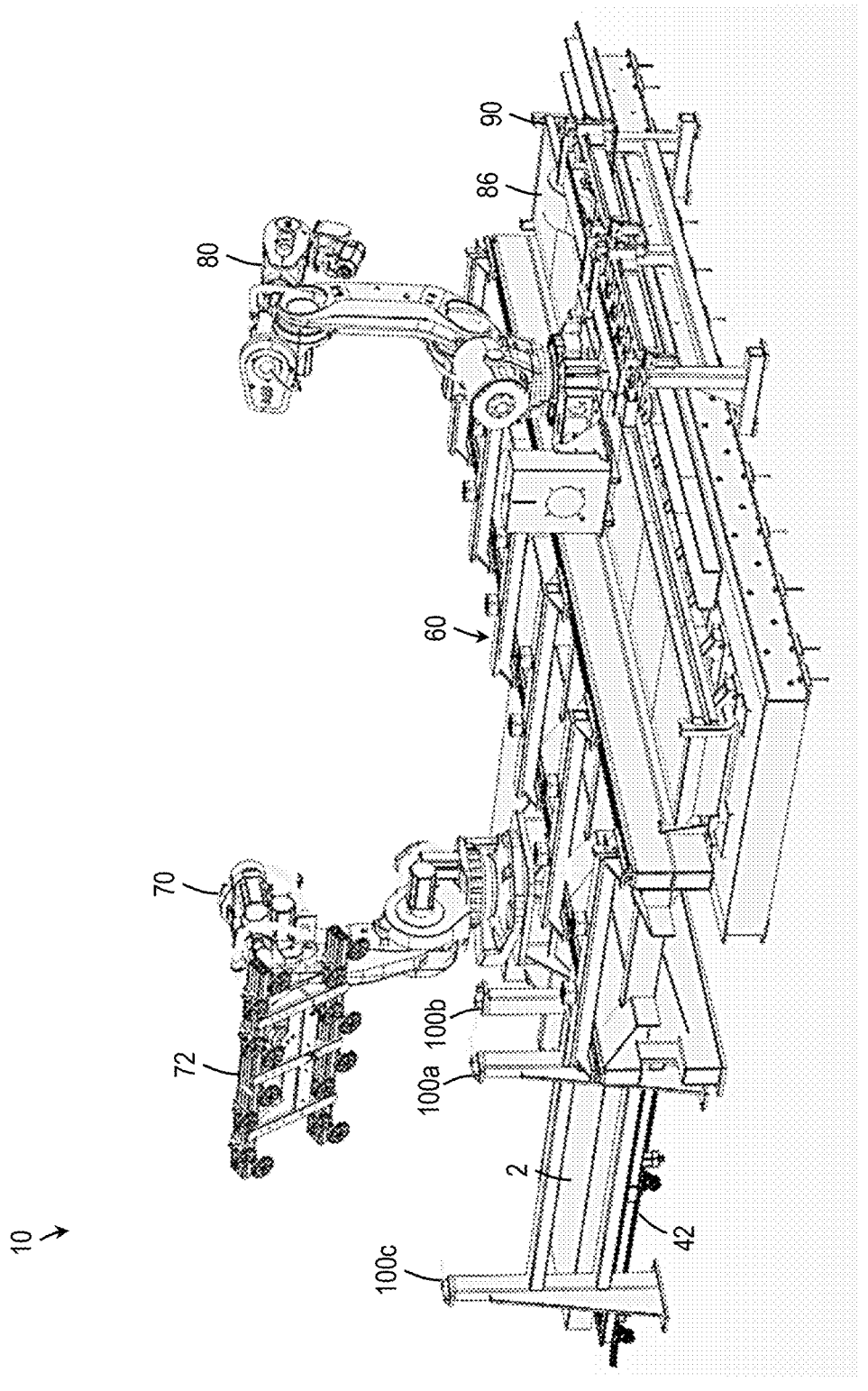

FIG. 28 is a flow chart of an embodiment of a panel handling and milling method 300 implemented by the processor 120 of the system 10 executing the panel handling and milling instructions 124. FIG. 6 shows the system 10 before the implementation of the method, with at least one panel 2 stacked on the input platform 42 in the input staging area 40, and the PHRA 70 in a ready position.

Figure 7:
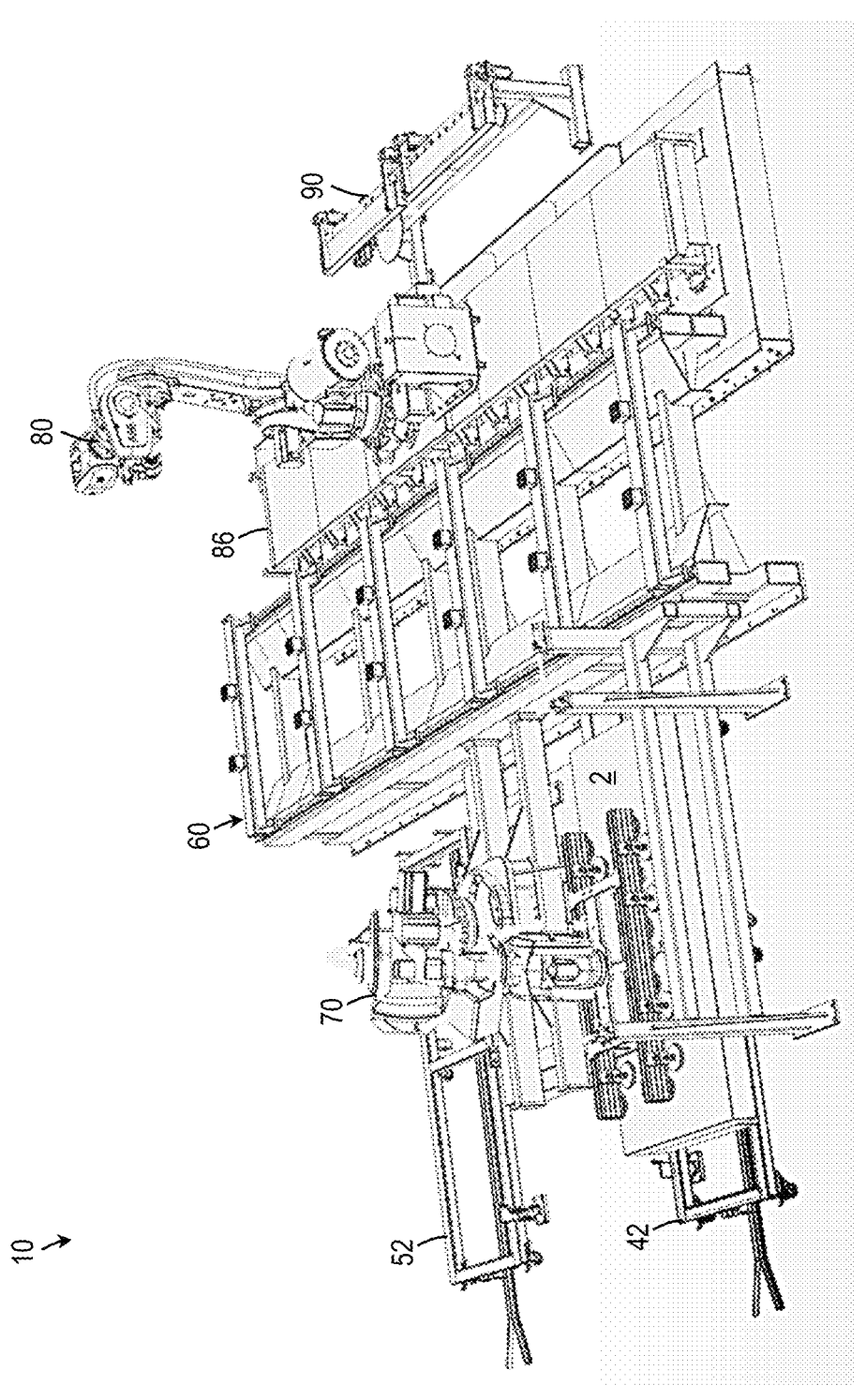
Figure 8B:
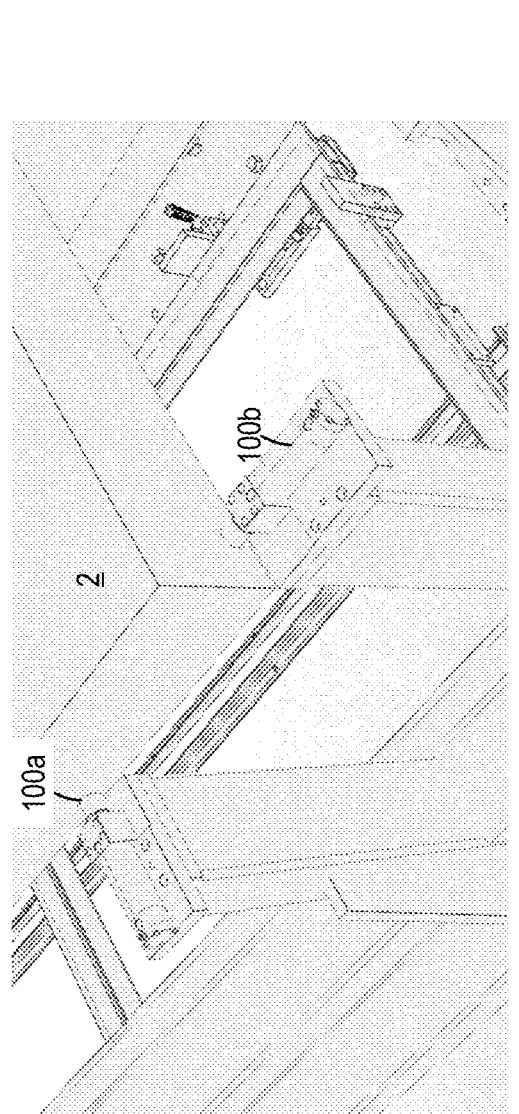
FIG. 8B shows an enlarged view of a portion of FIG. 8A, with the probes of the contact position sensors in their retracted positions in which they do not engage the panel edges.
Figure 8C:
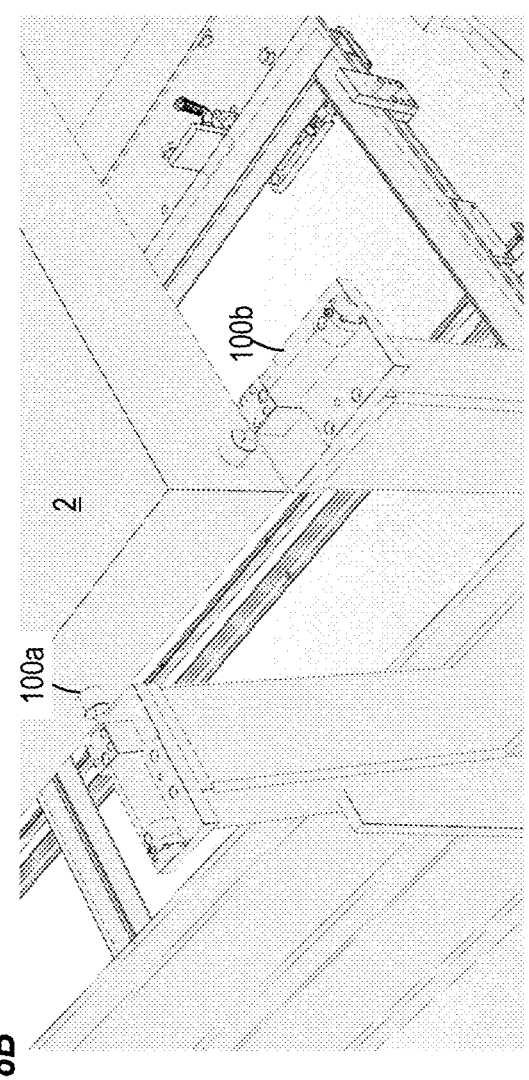
FIG. 8C shows an enlarged view of a portion of FIG. 8A, with the probes of the contact position sensors in their extended positions in which they engage the panel edges.
Figure 9:
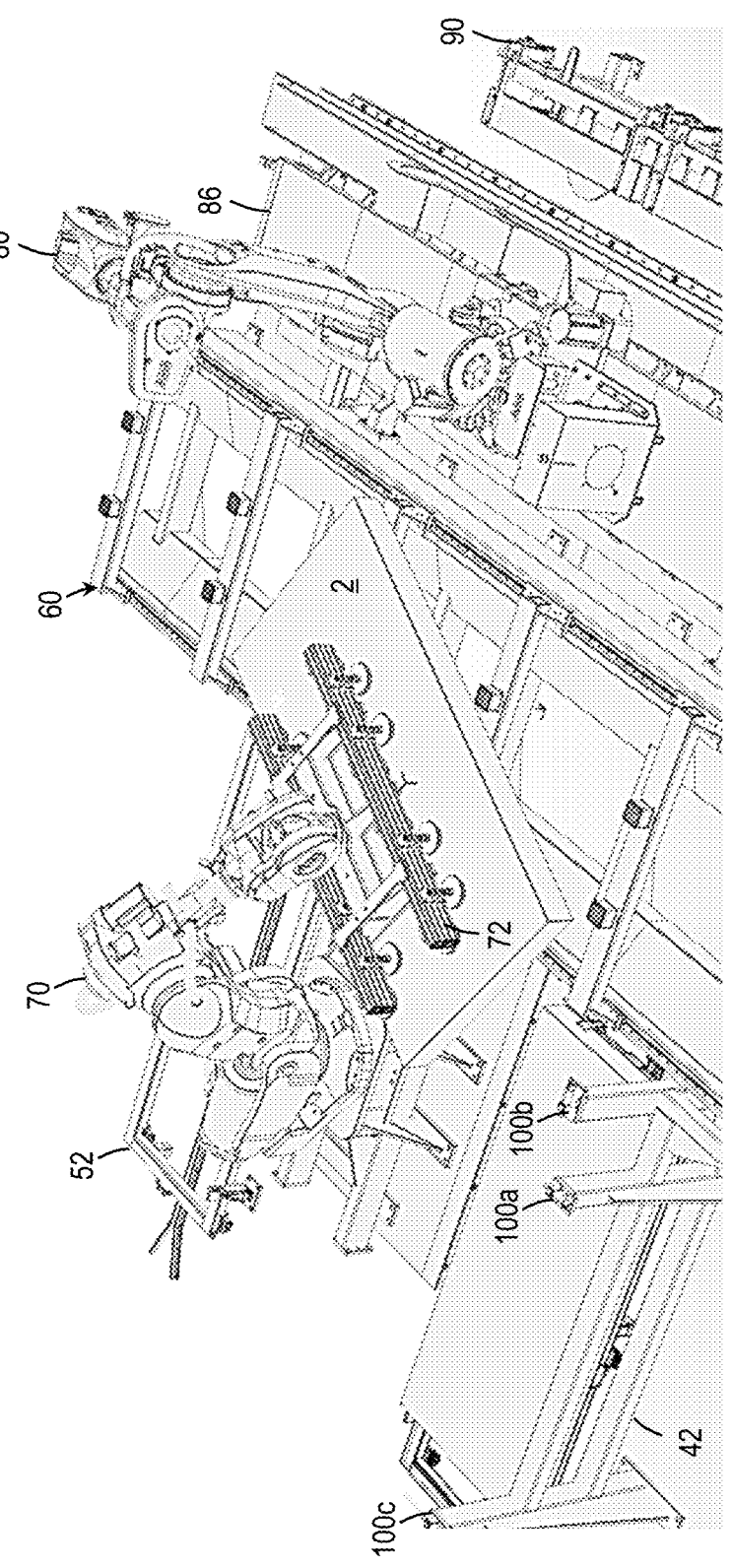
Figure 10:
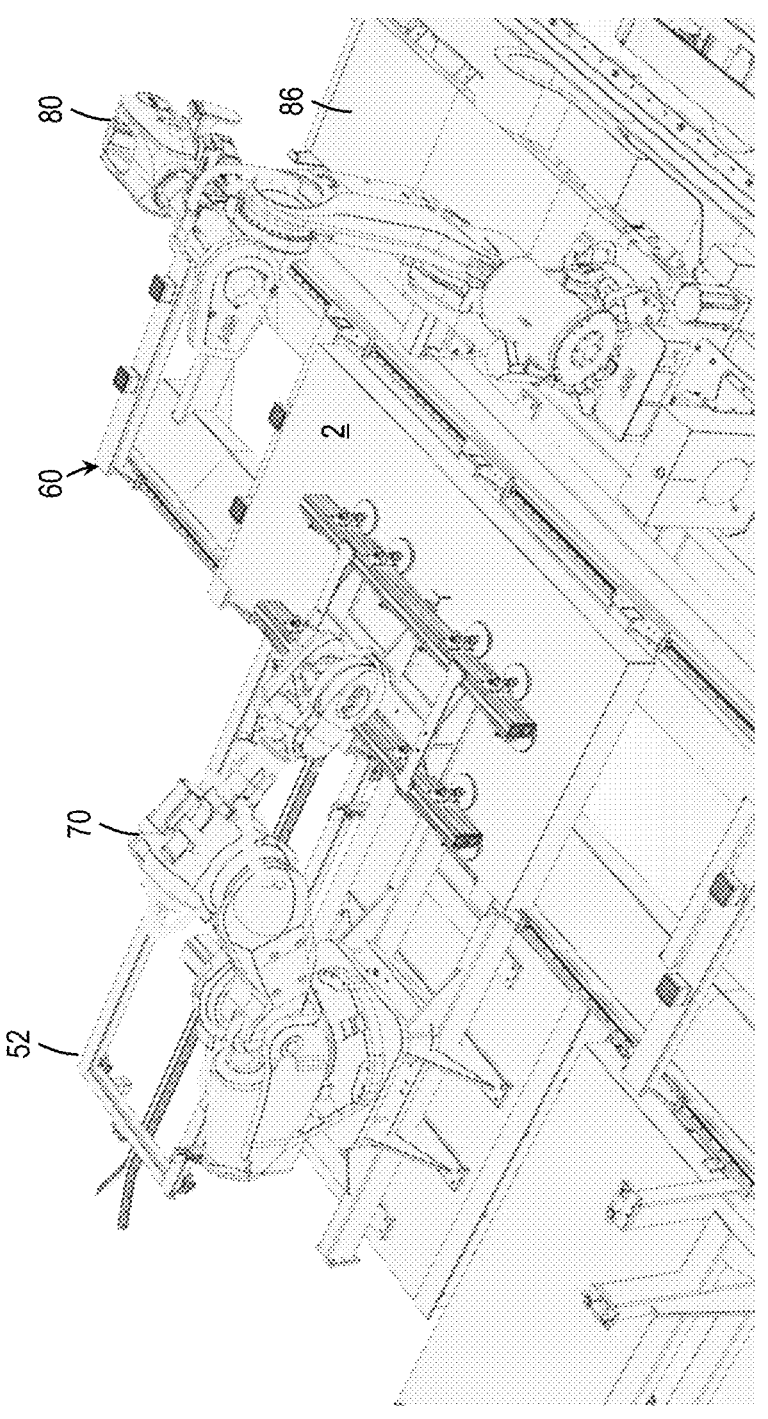

At step 202, the processor 120 controls the PHRA 70 to move the panel 2 from the input staging area 40 to the milling platform 60, and release the panel on the milling platform 60. FIGS. 7 to 10 shows stages of this step. FIG. 7 shows the holding tool 72 of the PHRA 70 engaging the front side of the panel 2 on the input platform 42. FIG. 8A shows the PHRA 70 lifting the panel 2 above the input platform 42, and so that the panel edges are level with and in proximity to the probes of the contact position sensors 100. FIG. 8B shows the probes of the contact position sensors 100 in their retracted positions, so that they do not engage the panel edges. FIG. 8C shows the probes of the contact position sensors 100 after they have been actuated to their extended positions to engage panel edges. When the probe engages the panel edge, the position of the panel edge engaged by the probe is measured using the contact position sensor. (This is used to implement the panel placement method described below.) FIG. 9 shows the shows the PHRA 70 moving the panel toward the milling platform 60. In embodiments where the system 10 includes the doorway 36 (as shown in FIG. 4A), the PHRA 70 moves the panel through the open doorway 36. FIG. 10 shows the PHRA 70 releasing panel on the milling platform 60 such that the front side of the panel 2 faces away from the milling platform 60 and the reverse side 7 of the panel 2 faces toward the milling platform 60. The PHRA 70 then returns to its ready position.

At step 204, the processor 120 controls the motorized door 38 to close the doorway 36, and thereby separate the PHRA 70 from the milling platform 60 and the SRA 80 (as shown in FIG. 4B).

Figure 11:
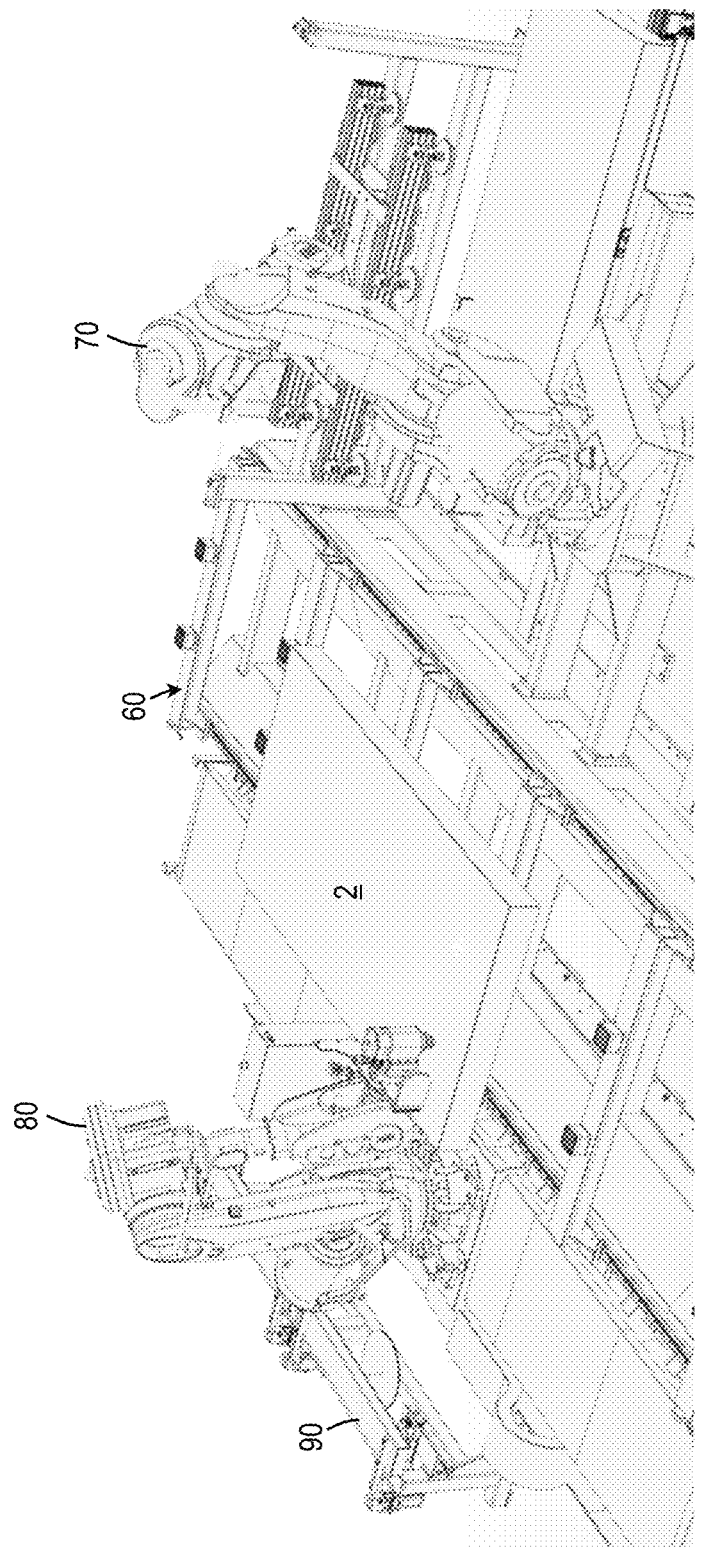
Figures 16, 17:
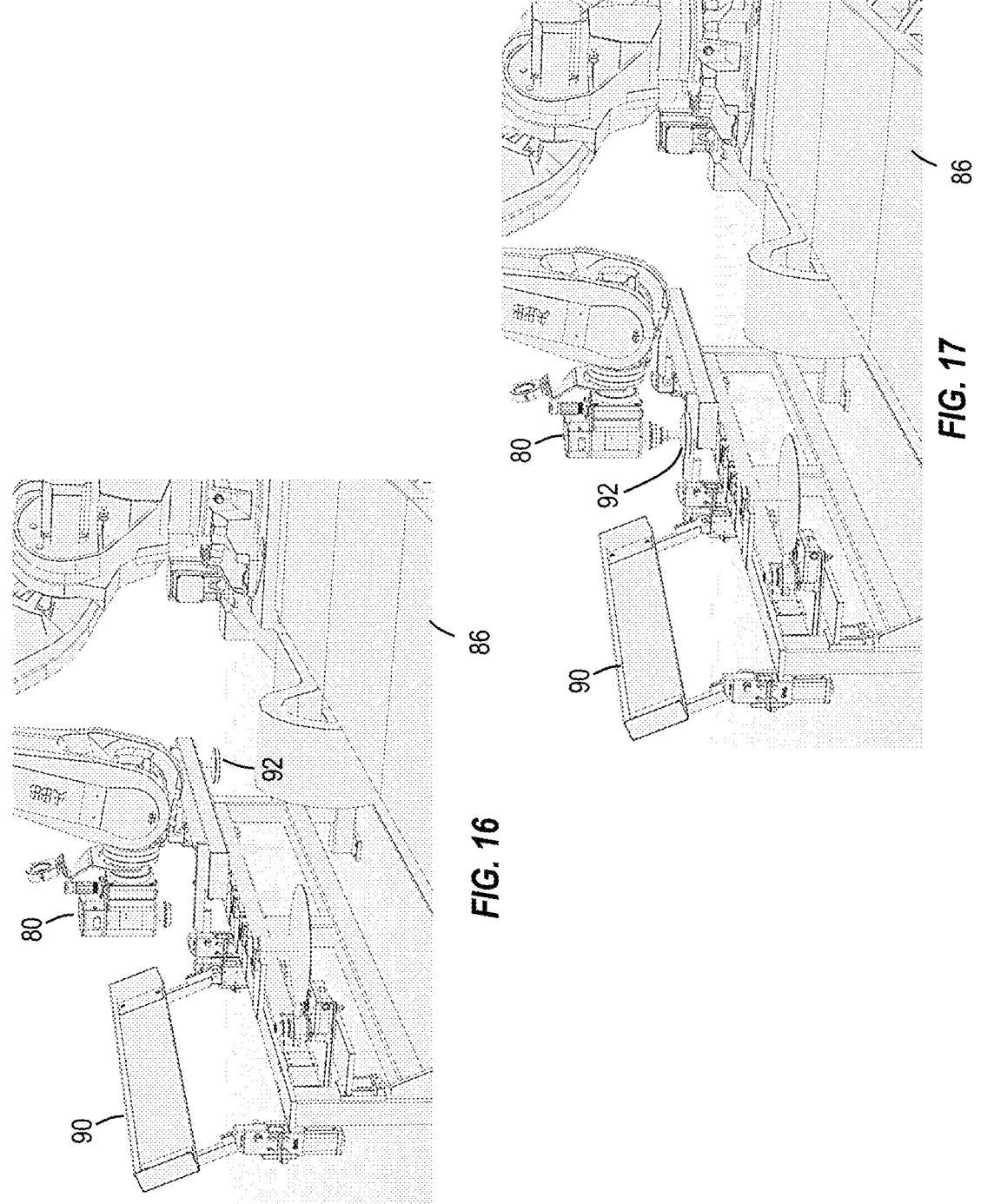

At step 206, the processor 120 controls the SRA 80 to mill the front side of the panel 2 as shown in FIG. 11. The milling operation may include the SRA 80 moving along the SRA rail 86 to a first position as shown in FIG. 12 to mill a first portion of the panel, and then to a second position as shown in FIG. 13 to mill a second portion of the panel. The milling operation may include the SRA 80 opening the closed toolbox 90 as shown in FIGS. 14 and 15 to access the set of additional tools as shown in FIG. 15, actuating the chuck of the SRA 80 to release the milling tool 82 as shown in FIG. 16, actuating the chuck of the SRA 80 to grip another milling tool 92 as shown in FIG. 17, and then continue performing the milling operation using the other milling tool 92.

At step 208, the processor 120 controls the motorized door 38 to open the doorway 36 (as shown in FIG. 4A).

Figure 18:
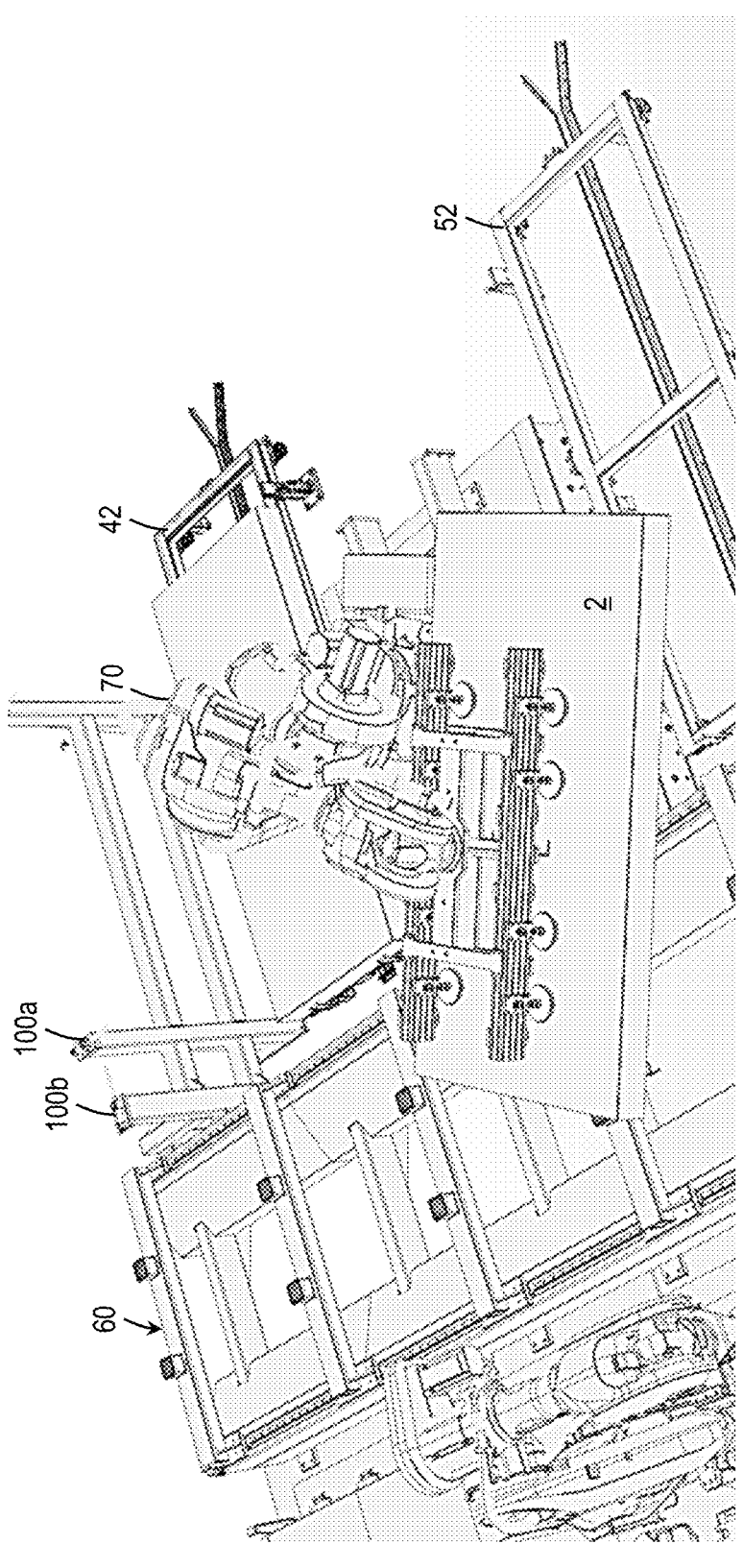
Figure 19:
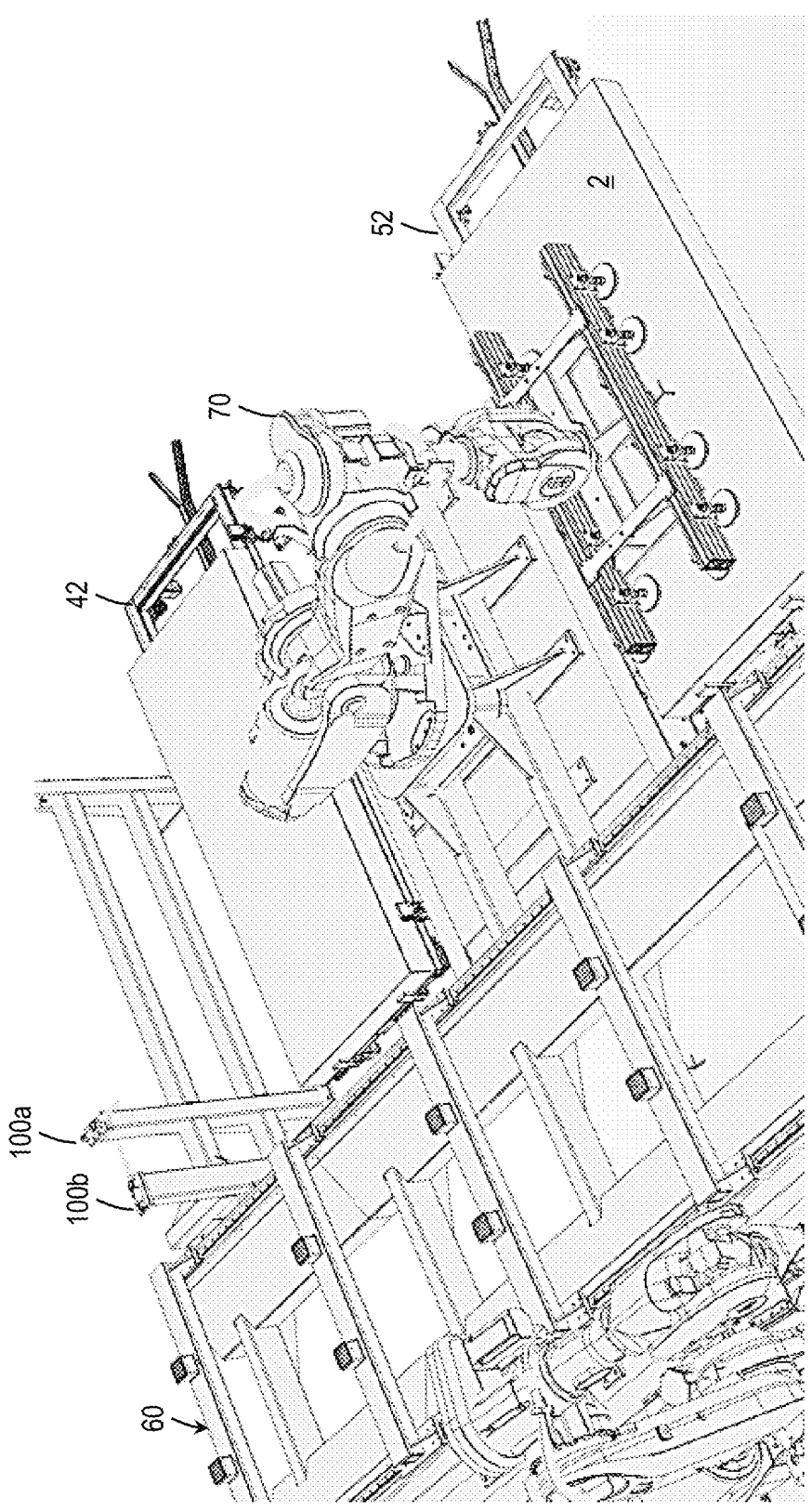

At step 210, the processor 120 controls the PHRA 70 to move the panel 2 from the milling platform 60 to output staging area 50 via the open doorway 36, and release the panel 2 at the output staging area 50. FIG. 18 shows the PHRA 70 moving the panel 2 toward the output platform 52. FIG. 19 shows the PHRA 70 releasing the panel 2 on the output platform 52.

In embodiments of the method, prior to step 210, at step 212 the processor 120 may control the PHRA 70 to move the panel 2 from the milling platform 60 to the panel flipping platform 110 as shown in FIG. 20, and disengage the holding tool 72 from the front side of the panel 2 to release the panel on the panel flipping platform 110 with the front side of the panel 2 facing away from the panel flipping platform 110 and with the reverse side 7 of the panel 2 facing toward the panel flipping platform 110. The processor 120 controls the PHRA 70 to pivot the panel, together with the panel flipping platform 110, upwards to the position as shown in FIG. 21 to expose the reverse side 7 of the panel 2 to the holding tool 72 of the PHRA 70. The processor 120 then controls the holding tool 72 of the PHRA 70 to engage the reverse side 7 of the panel as shown in FIG. 21. The processor 120 then controls the PHRA 70 to move the panel 2 to the milling platform 60, and release the panel 2 on the milling platform 60 with the reverse side 7 of the panel 2 facing upwards away from the milling platform 60 and the front side of the panel 2 facing downward towards the milling platform 60. The processor 120 may then repeat steps 204 to 208 before proceeding to step 210.

Panel Placement Method.

The panels on the input platform 42 may vary in position on the input platform 42 or the panels may vary in dimensions. As such, there may be some variation in the position on the panel 2 at which the holding tool 72 engages the panel 2. If the system 10 does not account for these variations, then there will be variation in the position on the milling platform 60 at which the PHRA 70 releases the panel 2, and potential imprecision of the milling operation performed by the SRA 80 on the panel 2. To address this problem, FIG. 29 is a flow chart of an embodiment of a panel placement method 300 implemented by the processor 120 executing the panel placement method instructions 126.

At step 302, the processor 120 controls the contact position sensors 100 to engage the panel 2 and generate the positional data while the holding tool 72 of the PHRA 70 is holding the panel as shown in FIG. 8A.

At step 304, the processor 120 determines a reference position of the panel relative to the holding tool 72 based at least on the positional data. For example, having regard to FIG. 8A, the processor 120 can determine the position of the panel first edge 6 using the positional data from the first contact position sensor 100a and/or the third contact position sensor 100c. The processor 120 can determine the position of the panel second edge 8 using the positional data from the second contact position sensor 100b. The processor 120 maps the position of the holding tool 72 serving as the end effector of the PHRA 70. Therefore, the processor 120 can calculate the reference position of the panel corner (i.e. the intersection of the panel first edge 6 and the panel second edge 8) relative to the holding tool 72 in a Cartesian plane coplanar with the panel 2.

At optional step 306, the processor 120 determines a reference orientation of the panel 2 relative to the holding tool 72 based at least on the positional data. As an example, having regard to FIG. 8A, the processor 120 can determine the position of the panel first edge 6 at the location of the first position sensor and location of the third contact position sensor 100c. Assuming that the first panel edge 6 is straight and the distance between these two positions is prescribed, the processor 120 can calculate, using a trigonometric relationship, the reference orientation of the panel about an axis perpendicular to the Cartesian plane coplanar with the panel 2. The processor 120 maps the orientation of the holding tool 72 serving as the end effector of the PHRA 70. Therefore, the processor 120 can calculate the reference orientation of the panel relative to the holding tool 72.

At step 308, the processor 120 controls the PHRA 70 to move the holding tool 72 to a release position, and optionally a release orientation, for releasing the panel on the milling platform 60. The release position is based at least on the reference position, based on the positional data. The optional reference orientation is based at least on the reference orientation, based on the positional data. For example, the instructions for the panel placement method 300 may account for the reference position and reference orientation in determining the release position and release orientation of the holding tool 72, in order to release the panel at specified positional coordinates and at a specified orientation on the milling platform 60.

Once the PHRA 70 has moved the holding tool 72 to the release position, and optionally the release orientation, the PHRA 70 releases the panel on the milling platform 60 in step 202 of the panel handling and milling method 200 described above with reference to FIG. 28.

Vacuum Pod Positioning Method.

It would be desirable for the system 10 to accommodate panels having a variety of different input geometries (i.e. the geometry before the panel is milled) and a variety of different output geometries (i.e. the geometry after the panel is milled). As previously described, the position of one or more of the vacuum pods 66 of the milling platform 60 can be adjusted to achieve this objective. While this adjustment could be performed manually, it may be more efficient and safer for the adjustment to be performed automatically by the system 10. Accordingly, FIG. 30 is a flow chart of a vacuum pod 66 positioning method 400 implemented by the processor 120 executing the vacuum pod position method instructions 128, in conjunction with a robotic arm. In one embodiment, as shown in FIGS. 22 and 23, the robotic arm may be the SRA 80 comprising a suction surface 84 to sealingly engage the vacuum pod 66 such that movement of the sealing tool (i.e., the suction surface 84) causes the vacuum pod 66 to move in unison with the sealing tool. (The SRA 80 may interchange the suction surface with a milling tool). In other embodiments, the robotic arm may be a robotic arm other than the SRA 80.

At step 402, the processor 120 controls the SRA 80 to move the suction surface 84 into sealing engagement with the vacuum pod 66 at a first position on the milling platform 60, as shown in FIG. 22.

At step 404, the processor 120 controls the SRA 80 to move the suction surface 84, with the vacuum pod 66 sealing engaged thereto, from the first position to a second position on the milling platform 60. The second position may be stored in the memory 122 in association with data describing a geometry of the panel 2. The memory 122 may store a database ("library") of panels defined by different geometries (input and/or output geometries) and associated vacuum pod 66 positions on the milling table. The memory 122 may store a sequence of panels to be milled, as defined by such geometries and associated vacuum pod 66 positions. Accordingly, the vacuum pods 66 of the milling platform 60 may be rapidly re-configured so that the system 10 can receive and/or produce panels having different geometries.

In one embodiment, step 404 may be implemented in two sub-steps. In substep (i), the SRA 80 moves the suction surface 84 in unison with the milling platform beam 64 in a first direction relative to the milling platform rail 62. This sub-step can be performed while the vacuum pod 66 applies a suction force to the milling platform beam 64 so that the vacuum pod 66 remains attached to the milling platform beam 64. In sub-step (ii), the SRA 80 moves the suction surface 84 in the second direction relative to the milling platform 60 beam 64. This sub-step can be performed while the vacuum pod 66 does not apply a suction force to the milling platform beam 64 so that the SRA 80 can lift the vacuum pod 66 off the milling platform beam 64.

At step 406, the processor 120 controls the SRA 80 to disengage the suction surface 84 from the vacuum pod 66 at the second position on the milling platform 60.

The method 400 can be repeated with each of the plurality of vacuum pods 66 as necessary. After the vacuum pods 66 have been appropriately positioned, the method may continue with the PHRA 70 releasing the panel on the milling panel at step 202 of the panel handling and milling method 200.

PARTICULAR EXAMPLES

While the description contained herein constitutes a plurality of embodiments of the present disclosure, it will be appreciated that the present disclosure is susceptible to further modification and change without departing from the fair meaning of the accompanying claims.

Without limiting the generality of the foregoing, the present disclosure includes aspects according to the following examples. It will be understood that any reference to a series of examples is to be understood as a reference to each of those examples disjunctively (e.g., "any one of examples 1 to 4" is to be understood as "examples 1, 2, 3, or 4"). Further, it will be understood that features of individual examples of some aspects may be combined with features of individual examples of other aspects (e.g., features of examples 1 to 25, may be combined with features of examples 26 to 31, and/or features of examples 32 to 35). In particular, the WHRA of the system of any of one of examples 1 to 25 may be the WHRA of the system of any one of examples 26 to 31. In particular, one of the at least one SRA of the system of examples 1 to 25 may be the RA of the system of any one of examples 32 to 35, having interchanged the milling tool with the suction surface.

In some aspects, the present disclosure provides a system for processing a workpiece from an input staging area to an output staging area according to one or more of the following examples.

Example 1. A system (10) for processing a workpiece (2) from an input staging area (40) to an output staging area (50), the system (10) comprising:

a milling platform (60);

a workpiece handling robotic arm (WHRA) (70) comprising a holding tool (72) adapted to releasably hold the workpiece (2), wherein the WHRA (70) is adapted to move the workpiece (2) from the input staging area (40) to the milling platform (60), and from the milling platform (60) to the output staging area (50), and wherein a base of the WHRA (70), the input staging area (40), the output staging area (50) are all positioned on a same side of the milling platform (60); and at least one spindle robotic arm (SRA) (80) comprising a milling tool (82), wherein the at least one SRA (80) is adapted to mill the workpiece (2) when supported on the milling platform (60).

Example 2. The system (10) of example 1, wherein the input staging area (40) and the output staging area (50) are spaced apart from each other, and the WHRA base is disposed between the input staging area (40) and the output staging area (50).

Example 3. The system (10) of any one of examples 1 to 2, wherein the at least one SRA (80) comprises a SRA base, and the milling platform (60) is disposed between the WHRA base and the SRA base.

Example 4. The system (10) of any one of examples 1 to 3, wherein the system (10) further comprises either one or both of:

an input platform (42) to support the workpiece (2) at the input staging area (40), wherein the input platform (42) is movable toward and away from the WHRA (70); or an output platform (52) to support the workpiece (2) at the output staging area (50), wherein the output platform (52) is movable toward and away from the WHRA (70).

Example 5. The system (10) of example 4, wherein the system (10) further comprises either one or both of:

an input wheeled cart comprising the input platform (42); or an output wheeled cart comprising the output platform (52).

Example 6. The system (10) of any one of examples 4 to 5, wherein the system (10) further comprises either one or both of:

an input track (44) engaged by the input platform (42) to guide movement of the input platform (42) toward and away from the WHRA (70); or an output track (54) engaged by the output platform (52) to guide movement of the output platform (52) toward and away from the WHRA (70).

Example 7. The system (10) of any one of examples 1 to 6, wherein the holding tool (72) comprises a vacuum lifter.

Example 8. The system (10) of any one of examples 1 to 7, wherein the milling tool (82) comprises either a bit, blade, disc, or drum for cutting, drilling, engraving, grinding, routing or sanding the workpiece (2).

Example 9. The system (10) of any one of examples 1 to 8, wherein the system (10) further comprises:

a workpiece flipping platform (110) pivotable to expose a reverse side of the workpiece (2) to the holding tool (72) of the WHRA (70), when the workpiece (2) is supported on the workpiece flipping platform (110).

Example 10. The system (10) of example 9, wherein the workpiece flipping platform (110) is disposed on the same side of the milling platform (60) as the input staging area (40) and the output staging area (50).

Example 11. The system (10) of any one of examples 1 to 10, wherein the system (10) further comprises:

a processor (120) operatively connected to the WHRA (70), and the at least one SRA (80), and configured by a non-transitory computer readable medium (122) storing instructions executable by the processor (120) to implement a method comprising:

controlling the WHRA (70) to move the workpiece (2) from the input staging area (40) to the milling platform (60), and release the workpiece (2) on the milling platform (60);

controlling the at least one SRA (80) to mill the workpiece (2); and controlling the WHRA (70) to move the workpiece (2) from the milling platform (60) to the output staging area (50), and release the workpiece (2) at the output staging area (50).

Example 12. The system (10) of any one of examples 1 to 10, wherein the system (10) further comprises:

a doorway (36) that allows the WHRA (70) to move the workpiece (2) between the milling platform (60) and the input staging area (40) and the output staging area (50); and a motorized door (38) actuable between an open position to open the doorway (36) and a closed position to close the doorway (36) and separate the WHRA (70) from the milling platform (60) and the at least one SRA (80).

Example 13. The system (10) of example 12, wherein the system (10) further comprises:

a processor (120) operatively connected to the WHRA (70), the at least one SRA (80), and the motorized door (38), and configured by a non-transitory computer readable medium (122) storing instructions executable by the processor (120) to implement a method comprising:

controlling the WHRA (70) to move the workpiece (2) from the input staging area (40) via the open doorway (36) to the milling platform (60), and release the workpiece (2) on the milling platform (60);

controlling the motorized door (38) to close the doorway (36);

controlling the at least one SRA (80) to mill the workpiece (2) while the doorway (36) is closed;

controlling the motorized door (38) to open the doorway (36); and controlling the WHRA (70) to move the workpiece (2) from the milling platform (60) via the open doorway (36) to the output staging area (50), and release the workpiece (2) at the output staging area (50).

Example 14. The system (10) of any one of examples 1 to 13, wherein the WHRA base is movable relative to the milling platform (60).

Example 15. The system (10) of example 14, wherein the system (10) comprises a WHRA rail (74), wherein the WHRA base is movably attached to the WHRA rail (74) to allow the WHRA base to move relative to the milling platform (60).

Example 16. The system (10) of any one of examples 1 to 15, wherein the at least one SRA (70) comprises a SRA base that is movable relative to the milling platform (60).

Example 17. The system (10) of example 16, wherein the system (10) comprises a SRA rail (86), wherein the SRA base is movably attached to the SRA rail (86) to allow the at least one SRA (80) to move relative to the milling platform (60).

Example 18. The system (10) of any one of examples 1 to 17, wherein the at least one SRA (80) comprises a plurality of SRAs (80).

Example 19. The system (10) of example 18, wherein the plurality of SRAs (80) comprises a first SRA (80) and a second SRA (80) spaced on one side of the milling platform (60).

Example 20. The system (10) of example 18, wherein the plurality of SRAs (80) comprises a first SRA (80) and a second SRA (80) disposed on opposite sides of the milling platform (60).

Example 21. The system (10) of any one of examples 18 to 20, wherein the system (10) further comprises an additional tool (92), wherein each of the plurality of SRAs (80) are adapted to interchange the milling tool (82) with the additional tool (92).

Example 22. The system (10) of example 21, wherein the additional tool (92) comprises an additional milling tool comprising a bit, blade, disc, or drum for cutting, drilling, engraving, grinding, routing or sanding the workpiece (2).

Example 23. The system (10) of any one of examples 21 to 22, wherein the additional tool (92) comprises a suction surface (84) to sealingly engage a vacuum pod (66) of the milling platform (60).

Example 24. The system (10) of any one of examples 1 to 23, wherein the milling platform (60) comprises a milling platform first part and a milling platform second part movably attached to the milling platform first part to allow the milling platform (60) second part to move relative to the milling platform first part and thereby vary at least one horizontal dimension of the milling platform.

Example 25. The system (10) of any one of examples 1 to 24, wherein the workpiece (2) comprises a panel.

In some aspects, the present disclosure provides a system for controlling a workpiece handling robotic arm (WHRA) comprising a holding tool to release a workpiece on a milling platform according to one or more of the following examples.

Example 26. A system (10) for controlling a workpiece handling robotic arm (WHRA) (70) comprising a holding tool (72) to release a workpiece (2) on a milling platform (60), the system (10) comprising: a plurality of contact position sensors (100), wherein each of the plurality of contact position sensors (100) comprises a probe actuable to engage the workpiece (2), wherein different ones of the probes engage the workpiece (2) at different workpiece (2) locations, and wherein the plurality of the contact position sensors (100) are configured to collectively generate positional data indicative of a position of the workpiece (2) in at least a two dimensional plane; and a processor (120) operatively connected to the plurality of contact position sensors (100) and the WHRA (70), and configured by a non-transitory computer readable medium (122) storing instructions executable by the processor (120) to implement a method comprising:

actuating probes of the plurality of contact position sensors (100) to engage the workpiece (2) and generate the positional data; and controlling the WHRA (70) to move the holding tool (72) to a release position for releasing the workpiece (2) on the milling platform (60), wherein the release position is based at least on the positional data.

Example 27. The system (10) of example 26, wherein: the method comprises:

controlling the WHRA (70) to move the holding tool (72) to a release orientation for releasing the workpiece (2) on the milling platform (60), wherein the release orientation is based at least on the positional data.

Example 28. The system (10) of any one of examples 26 to 27, wherein the workpiece (2) comprises a workpiece first edge (4) extending in a first direction, and a workpiece second edge (6) extending in a second direction substantially perpendicular to the first direction, and wherein:

the plurality of contact position sensors (100) comprises:

a first contact position sensor (100) comprising a probe actuable to engage the workpiece first edge (4) and configured to measure a position of the workpiece first edge (4) in the second direction; and a second contact position sensor (100) comprising a probe actuable to engage the workpiece second edge (6) and configured to measure a position of the workpiece second edge (6) in the first direction.

Example 29. The system (10) of example 28, wherein: the plurality of contact position sensors (100) comprises:

a third contact position sensor (100) comprising a probe actuable to engage the workpiece first edge (4) and configured to measure a position of the workpiece first edge (4) in the second direction.

Example 30. The system (10) of any one of examples 26 to 29, wherein at least one of the contact position sensors (100) comprises a linear variable differential transformer (LVDT) position sensor.

Example 31. The system (10) of any one of examples 26 to 30, wherein at least one of the contact position sensors (100) comprises a touch probe.

In some aspects, the present disclosure provides a system for positioning a vacuum pod movable relative to a milling platform according to one or more of the following examples.

Example 32. A system (10) for positioning a vacuum pod (66) movable relative to a milling platform (60), the system (10) comprising:

a robotic arm (RA) (80) comprising a suction surface (84) to sealingly engage the vacuum pod (66) such that movement of the suction surface (84) causes the vacuum pod (66) to move in unison with the suction surface (84); and a processor (120) operatively connected to the RA, and configured by a non-transitory computer readable medium (122) storing instructions executable by the processor (120) to implement a method comprising:

controlling the RA (80) to move the suction surface (84) into sealing engagement with the vacuum pod (66) at a first position on the milling platform (60);

controlling the RA (80) to move the suction surface (84) with the vacuum pod (66) sealingly engaged thereto from the first position to a second position on the milling platform (60); and controlling the RA (80) to disengage the suction surface (84) from the vacuum pod (66) at the second position on the milling platform (60).

Example 33. The system (10) of example 32, wherein controlling the RA (80) to move the suction surface (84), with the vacuum pod (66) sealingly engaged thereto, comprises lifting the vacuum pod (66) off of the milling platform (60).

Example 34. The system (10) of any one of examples 32 to 33, wherein the milling platform (60) comprises a milling platform rail (62) extending in a horizontal first direction, and a milling platform beam (64) extending in a second horizontal direction at a non-zero angle to the first direction, movably attached to the milling platform rail (62) for adjusting a position of the milling platform beam (64) relative to the milling platform rail (62) in the first direction, and supporting the vacuum pod (66), wherein:

controlling the RA (80) to move the suction surface (84) with the vacuum pod (66) sealingly engaged thereto, comprises:

controlling the RA (80) to move the suction surface (84) in unison with the milling platform beam (64) in the first direction relative to the milling platform rail (62); and controlling the RA (80) to move the suction surface (84) in the second direction relative to the milling platform beam (64).

Example 35. The system (10) of any one of examples 32 to 34, wherein:

the non-transitory computer readable medium (122) stores coordinates of the second position of the vacuum pod (66) in association with data describing a geometry of a workpiece (2) to be supported on the vacuum pod (66).

PARTS LIST

2 panel or workpiece
4 panel or workpiece, first panel edge
6 panel or workpiece, second panel edge
7 panel or workpiece, reverse side
8 floor surface
10 system
20 panel or workpiece handling enclosure
22 panel or workpiece handling enclosure, input door
24 panel or workpiece handling enclosure, output door
25 milling enclosure
32 milling enclosure, window
34 milling enclosure, door
36 doorway
38 motorized door
40 input staging area
42 input platform
44 input track
50 output staging area
52 output platform
54 output track
60 milling platform

62 milling platform, rail
64 milling platform, beam
66 milling platform, vacuum pod
68 milling platform, trough
70 panel or workpiece handling robotic arm (PHRA or WHRA)
72 PHRA or WHRA, holding tool
74 PHRA or WHRA, rail
80 spindle robotic arm (SRA) or robotic arm (RA)
82 SRA, milling tool
84 SRA, suction surface
86 SRA, rail
90 toolbox
92 additional tool
100 contact position sensors
110 panel or workpiece flipping platform
112 panel or workpiece flipping support frame
114 panel or workpiece flipping bracket
120 processor
122 memory (non-transitory computer readable medium)
124 memory, panel handling & milling method instructions
126 memory, panel placement method instructions
128 memory, vacuum pod positioning method instructions
200-212 panel or workpiece handling and milling method and steps thereof
300-308 panel or workpiece placement method and steps thereof
400-406 vacuum pod placement method and steps thereof

The invention claimed is:

1. A system for processing a workpiece having a front side and a reverse side opposite to the front side, the system comprising:
a milling platform;
a workpiece flipping platform;
a workpiece handling robotic arm (WHRA) comprising a holding tool to releasably hold the workpiece, wherein the workpiece flipping platform is pivotable relative to the WHRA, and wherein the WHRA is positioned to move the workpiece to and from the milling platform, and positioned to move the workpiece to and from the workpiece flipping platform;
at least one spindle robotic arm (SRA) comprising a milling tool, wherein the at least one SRA is positioned to mill the workpiece when the workpiece is supported on the milling platform; and
a processor operatively connected to the WHRA, and configured by a non-transitory computer readable medium storing instructions executable by the processor to implement a method comprising, in sequence:
controlling the WHRA to move the holding tool into engagement with the front side of the workpiece while the workpiece is on the milling platform such that the front side of the workpiece faces away from the milling platform and such that the reverse side of the workpiece faces toward the milling platform;
controlling the WHRA to move the workpiece from the milling platform to the workpiece flipping platform while the holding tool engages the front side of the workpiece;
controlling the WHRA to move the holding tool out of engagement from the front side of the workpiece to release the workpiece onto the workpiece flipping platform such that the front side of the workpiece faces away from the workpiece flipping platform and such that the reverse side of the workpiece faces toward the workpiece flipping platform;
controlling the WHRA to pivot the workpiece flipping platform together with the workpiece supported thereon, relative to the WHRA, so as to expose the reverse side of the workpiece to the holding tool;
controlling the WHRA to move the holding tool into engagement with the reverse side of the workpiece while the workpiece is supported on the workpiece flipping platform and the reverse side of the workpiece is exposed to the holding tool;
controlling the WHRA to move the workpiece from the workpiece flipping platform to the milling platform while the holding tool engages the reverse side of the workpiece; and
controlling the WHRA to move the holding tool out of engagement from the reverse side of the workpiece to release the workpiece onto the milling platform such that the reverse side of the workpiece faces away from the milling platform and such that the front side of the workpiece faces toward the milling platform.

2. The system of claim 1, wherein the WHRA is positioned to move the workpiece from an input staging area to the milling platform and to move the workpiece from the milling platform to an output staging area, wherein the input staging area, the output staging area, and a base of the WHRA are all positioned on a same side of the milling platform, and wherein the input staging area and the output staging area are spaced apart from each other, and the base of the WHRA is disposed between the input staging area and the output staging area.

3. The system of claim 1, wherein the at least one SRA comprises a SRA base, and the milling platform is disposed between the WHRA base and the SRA base.

4. The system of claim 1,
wherein the WHRA is positioned to move the workpiece from an input staging area to the milling platform and to move the workpiece from the milling platform to an output staging area;
wherein the system further comprises either one or both of:
an input platform to support the workpiece at the input staging area, wherein the input platform is movable toward and away from the WHRA; or
an output platform to support the workpiece at the output staging area, wherein the output platform is movable toward and away from the WHRA.

5. The system of claim 4, wherein the system further comprises either one or both of:
an input wheeled cart comprising the input platform; or
an output wheeled cart comprising the output platform.

6. The system of claim 4, wherein the system further comprises either one or both of:
an input track engaged by the input platform to guide movement of the input platform toward and away from the WHRA; or
an output track engaged by the output platform to guide movement of the output platform toward and away from the WHRA.

7. The system of claim 1, wherein the holding tool comprises a vacuum lifter.

8. The system of claim 1, wherein the milling tool comprises either a bit, blade, disc, or drum for cutting, drilling, engraving, grinding, routing or sanding the workpiece.

9. The system of claim 1, wherein the processor is operatively connected to the at least one SRA; and wherein the method comprises:

controlling the at least one SRA to mill the front side of the workpiece while the workpiece is on the milling platform such that the front side of the workpiece faces away from the milling platform and such that the reverse side of the workpiece faces toward the milling platform; and controlling the at least one SRA to mill the reverse side of the workpiece while the workpiece is on the milling platform such that the reverse side of the workpiece faces away from the milling platform and such that the front side of the workpiece faces toward the milling platform.

10. The system of claim 1, wherein the WHRA is positioned to move the workpiece from an input staging area to the milling platform and to move the workpiece from the milling platform to an output staging area;

wherein the system further comprises:

a doorway that allows the WHRA to move the workpiece between the milling platform and the input staging area, and that allows the WHRA to move the workpiece between the milling platform and the output staging area;

a motorized door actuatable to an open position to open the doorway, and actuatable to a closed position to close the doorway and separate the WHRA from the milling platform and from the at least one SRA; and wherein the processor is operatively connected to the at least one SRA, and the motorized door, and wherein the method comprises:

controlling the WHRA to move the workpiece from the input staging area via the open doorway to the milling platform, and release the workpiece onto the milling platform;

controlling the motorized door to close the doorway;

controlling the at least one SRA to mill the workpiece while the doorway is closed;

controlling the motorized door to open the doorway; and controlling the WHRA to move the workpiece from the milling platform via the open doorway to the output staging area, and release the workpiece at the output staging area.

11. The system of claim 1, wherein the at least one SRA comprises a SRA base that is movable relative to the milling platform.

12. The system of claim 11, wherein the system comprises a SRA rail, wherein the SRA base is movably attached to the SRA rail to allow the at least one SRA to move relative to the milling platform.

13. The system of claim 1, wherein the system further comprises an additional tool, wherein the additional tool is interchangeable with the milling tool.

14. The system of claim 13, wherein the additional tool comprises an additional milling tool comprising a bit, blade, disc, or drum for cutting, drilling, engraving, grinding, routing or sanding the workpiece.

15. The system of claim 13, wherein the additional tool comprises a suction surface to sealingly engage a vacuum pod of the milling platform.

16. A system for processing a workpiece, the system comprising:

a milling platform, wherein the milling platform comprises a milling platform first part and a milling platform second part movably attached to the milling platform first part to allow the milling platform second part to move relative to the milling platform first part and thereby vary at least one horizontal dimension of the milling platform;

a workpiece handling robotic arm (WHRA) comprising a holding tool to releasably hold the workpiece, wherein the WHRA is positioned to move the workpiece to and from the milling platform;

a vacuum pod affixed to the milling platform second part and having a sealing surface;

a vacuum generator, comprising a pump or a blower, connected to the vacuum pod so as to generate suction at the sealing surface;

at least one spindle robotic arm (SRA) comprising a suction surface that is movable into sealing engagement with the sealing surface of the vacuum pod, and wherein the at least one SRA further comprises a milling tool interchangeable with the suction surface, wherein the at least one SRA is positioned to mill the workpiece when the workpiece is supported on the milling platform; and a processor operatively connected to the at least one SRA and configured by a non-transitory computer readable medium storing instructions executable by the processor to implement a method, comprising:

controlling the at least one SRA to move the suction surface into sealing engagement with the sealing surface; and while the suction surface is in sealing engagement with the sealing surface and while the vacuum generator is generating suction at the sealing surface, controlling the at least one SRA to move the suction surface whereby the suction surface moves the vacuum pod and the affixed milling platform second part in unison relative to the milling platform first part.

17. The system of claim 16, wherein the vacuum pod is removably affixed to the milling platform second part; and wherein the method further comprises, while the vacuum pod is not affixed to the milling platform second part, while the suction surface is in sealing engagement with the sealing surface and while the vacuum generator is generating suction at the sealing surface, controlling the at least one SRA to move the suction surface to move the vacuum pod to a different location on the milling platform second part.

* * * * *